Jan. 31, 1967     G. BECKER     3,301,478
REGISTERING BUSINESS MACHINE WITH A DEVICE
FOR COMPUTING AMOUNTS OF TAX OR DISCOUNT
Filed Sept. 9, 1964     15 Sheets-Sheet 1

Jan. 31, 1967  G. BECKER  3,301,478
REGISTERING BUSINESS MACHINE WITH A DEVICE
FOR COMPUTING AMOUNTS OF TAX OR DISCOUNT
Filed Sept. 9, 1964  15 Sheets-Sheet 4

Fig.4

```
16 V631231  *002536   △
16 V631232  *001350   △
16 V631233  *002773   St
16 V631234  *000428   △
16 V631235  *000310   △
16 V631236  *000018   △
16 V631237  *001317   St
            *004090 Tost
            *000122 Ste
            *008854 To
```
130

Fig.5

```
16 V631231  *000120 Le
16 V631232  *000880 Fl
16 V631233  *000618 Le
16 V631234  *000080 Ge
16 V631235  *000210 R
16 V631236  *000325 Le
16 V631237  *000540 S
16 V631238  *001317 Fl
            *004090 S%
            *000122 Rab
            *003968 Su
```
131

Fig.6

```
16 V631231  *002536   △
16 V631232  *001350   △
16 V631233  *002773   St
16 V631234  *000428   △
16 V631235  *000310   △
16 V631236  *000018   △
16 V631237  *001317   St
            *004090 Tost
            *000122 Ste
            *008854 Su
            *010000 Za
            *001146 Rü
```
132

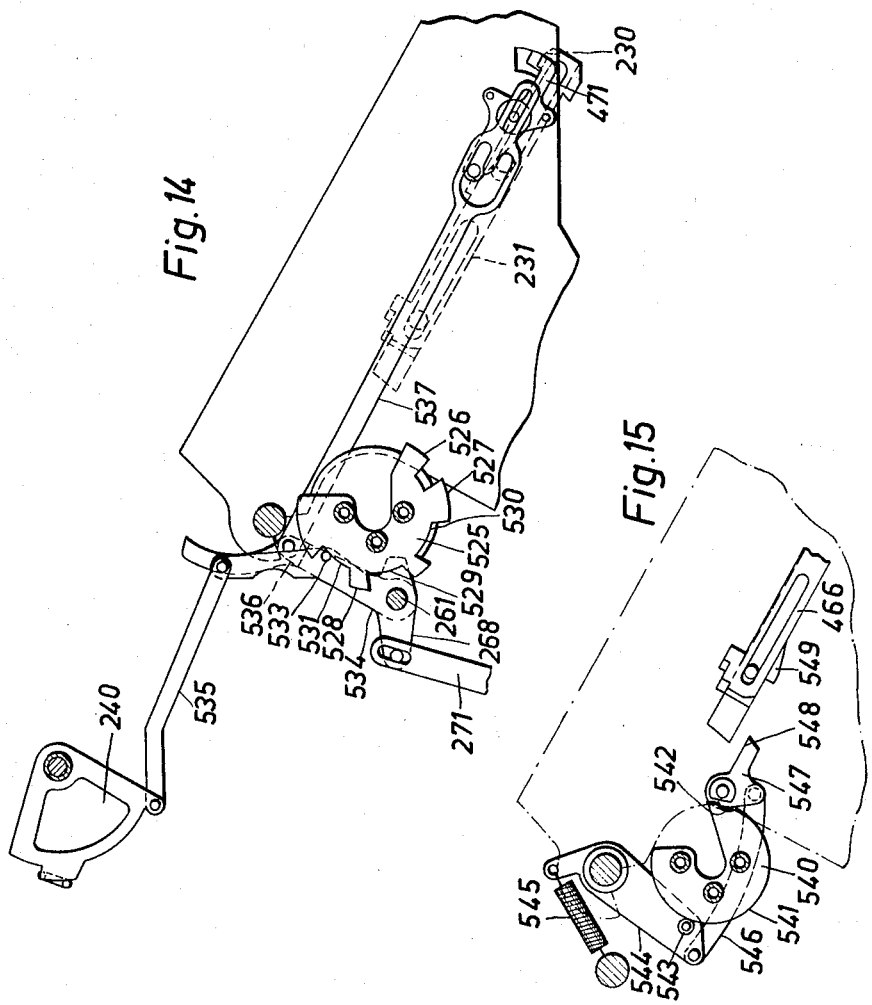

Jan. 31, 1967   G. BECKER   3,301,478
REGISTERING BUSINESS MACHINE WITH A DEVICE
FOR COMPUTING AMOUNTS OF TAX OR DISCOUNT
Filed Sept. 9, 1964   15 Sheets-Sheet 13
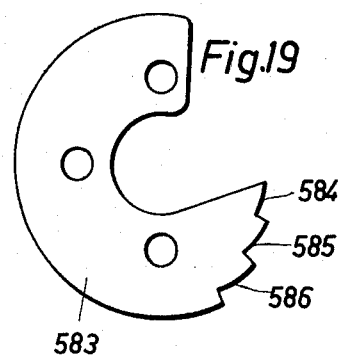
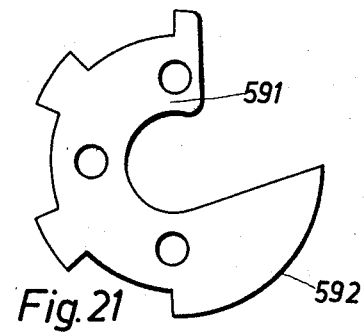
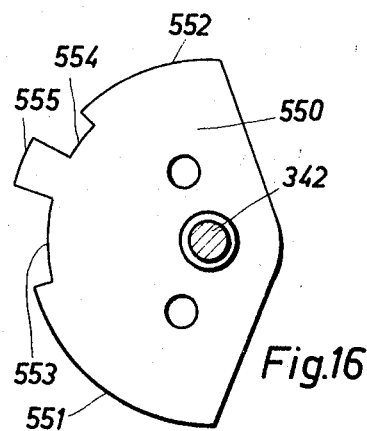
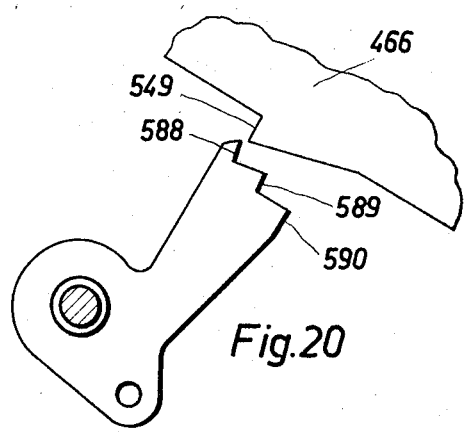

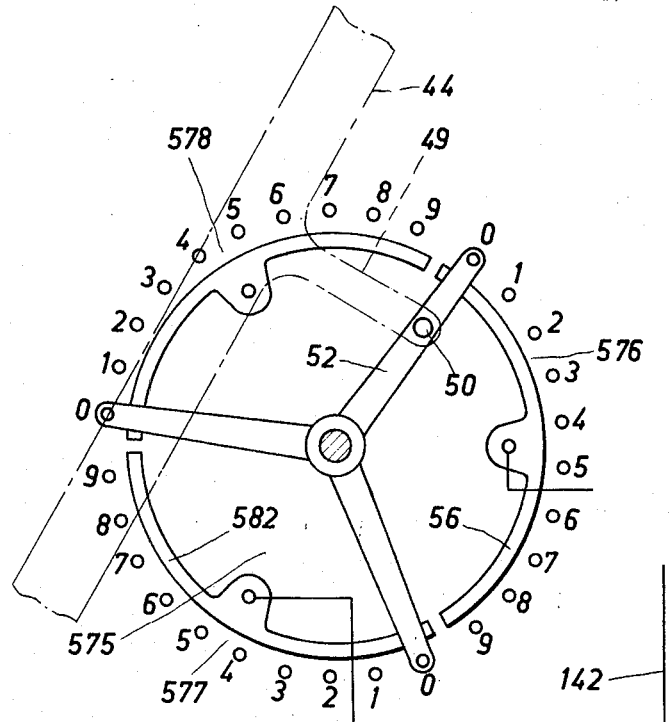
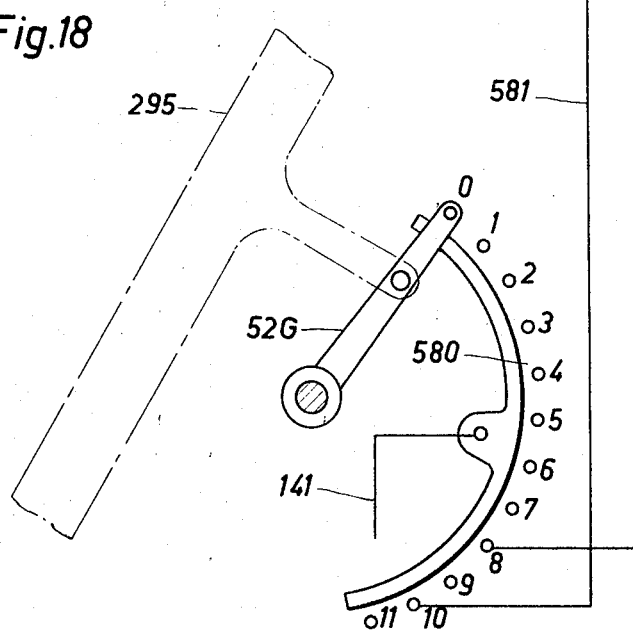
Fig.18

United States Patent Office 3,301,478
Patented Jan. 31, 1967

3,301,478
REGISTERING BUSINESS MACHINE WITH A DEVICE FOR COMPUTING AMOUNTS OF TAX OR DISCOUNT
Gerhard Becker, Bielefeld, Germany, assignor to Anker-Werke Aktiengesellschaft, Bielefeld, Germany, a corporation of Germany
Filed Sept. 9, 1964, Ser. No. 395,126
Claims priority, application Germany, Sept. 9, 1963,
A 43,998
32 Claims. (Cl. 235—7)

My invention relates to registering business machines, such as cash registers or accounting machines, and has for its general object to make such machines suitable for computation, registration and read-out of tax or discount amounts due on certain transaction items among those posted into the keyboard of the machine.

When a multiple-item transaction being posted into such a machine involves items not subject to tax or discount, as well as other items on which a tax or discount is due, the respectively different groups of items are entered into different adding mechanisms as well as into a totalizing mechanism. When terminating the entire transaction, the total to be paid by the customer is read out from the totalizing mechanism and printed. The usual way of including into the total any amount to be added or deducted in accordance with a given rate of tax or discount, has been to separately determine the amount, preferably by reading it from a table, and then entering, for example, the amount of the sales tax as a separate item into the keyboard of the machine so that it becomes added up in the grand total exhibited in the indicator or printed on the voucher or sales check issued by the machine.

This manner of operation is troublesome and time consuming. Since entering any amount of tax virtually requires three different steps of operation, errors are apt to occur when reading the amount of tax from a table and posting it into the keyboard; and the additional time thus required may form an appreciable share of the entire computating and registering procedure.

For that reason, a known cash register has been equipped with a device for computing and printing items on which a tax or discount is due. In this machine the individual items of this kind, or the sum of these items, is entered into a special computing mechanism where it is multiplied with the numerator of the fractional factor which constitutes the rate of tax or discount. The printing of the monetary value thus determined is then effected upon a voucher or check in a printing mechanism with a shift in digit position that correspondings to the denominator of the rate factor.

The tax or discount computing mechanism of this machine, equipped with a multiple tens-transfer device in the printer assembly, can only perform a multiplication with the aid of the computing mechanism, whereas the required division must be effected by the above-mentioned decimal-point shifting in the printing mechanism. Consequently, the computing mechanisms of the machine cannot effect any further processing of the amount thus determined.

Also known are electrical computing machines which utilize predetermined or previously calculated and hence fixed results which are ascertained by different computing operations with the aid of electrical circuits prepared or controlled by electrical or mechanical means. With the aid of such means, different values can be simultaneously posted into the machine, and the printed result is then immediately available for all numerical values. However, the machine only permits performing a single type of calculation, for example either a multiplication or a division, during one and the same machine run.

It is also known to perform a transverse addition of posted or entered multi-digital values by a single machine run with the aid of contact sliders adjustable to numerical values of posted magnitudes, which sliders prepare electric current paths for furnishing the results. The respective contact sliders for the same decimal position of the posted multi-digit values are grouped together, and connected with each other by electrical leads. The different contact slider groups are connected with each other by electrical tens-transfer devices so that a multi-digit result can be formed by a single machine run. This machine, too, is not suitable to perform different kinds of calculation simultaneously.

It is an object of my invention, relating to cash registers, accounting machines and the like, into which single or multiple items on which a tax or discount may be due are posted, to considerably shorten the time required for registering and computing the amounts of tax or discount.

Another, more specific object is to make such a machine capable of performing a tax or discount computing operation by simultaneously executing calculating operations of different type.

Another object of the invention is, during one and the same machine run, to draw the grand total or subtotal from a computing mechanism and also to perform a multiplication and a division, and to hold the resulting amount available for subsequent computing operations in the machine.

Still another object of the invention is to devise such a machine so that an amount of tax or discount, computed in the machine by drawing a sum and then performing division and multiplication, is automatically entered additively or subtractively into a totalizing mechanism which contains a transaction item, or the sum of such items, previously posted into the machine, to also indicate the amount corresponding to the tax or discount rate and to print it, and to then automatically draw the final balance from the totalizer mechanism.

A further object of the invention is to provide a cash-register, accounting machine or the like with a device for computing amounts of tax or discount in accordance with a given rate, in combination with a device for computing an amount of change due to a customer who tendered a higher amount than the computed final balance.

It is also an object of the invention, more specific than the one last mentioned, to considerably simplify the servicing of such a machine by having the computation of tax or discount amounts and the computation of the amount of change take place automatically.

An object, furthermore, is to also simplify the servicing of the machine by having the release of the tax or discount computing operations, as well as of the change computing operation, effected by one and the same control key of the keyboard.

To achieve these objects, and in accordance with a feature of my invention, I provide the registering business machine with at least one selector key to be actuated when the amount of a sales item being posted by means of the amount keys is subject to tax or discount, and with at least one adding mechanism into which these particular amounts are additively entered under control by the said selector key, aside from being entered into the totalizing computer or other adding mechanisms of the machine. I further provide means which, when actuated by a control key release a machine run which causes the sum to be drawn from said one adding mechanism and then automatically releases another machine run to operate multiplying computer means which form the product of that sum times the rate of the tax or discount, thus furnishing the amount of tax or discount. Furthermore, the machine is equipped with transfer means which enter the tax or discount amount into the totalizing computer already charged with the sales data, whereafter a terminating machine run produces the grand total or balance.

According to another, more specific feature of the invention, the registering business machine, such as a cash register or accounting machine, has respective electric selector switches coordinated to the differential mechanisms of the respective amount-key banks. The fixed contacts of each selector switch are connected with a number of electromagnets which have respective magnetically operable members sequentially arranged along the displacement path of the differential mechanisms to be scanned by the differential mechanisms during the displacing travel of the latter. The electric circuits interconnecting the groups of switch contacts with the electromagnets are such that the switches and magnets constitute a system of logic components for multiplying the rate of tax or discount with the sum of the items to which this rate applies. That is, the totalized sum of the posted items subject to tax or discount at a given rate is taken from an adding mechanism of the machine and, by virtue of the above-mentioned circuitry, is multiplied with the numerator of that rate and the resulting product is divided by the denominator so that the ultimate result constitutes the amount of tax or discount which is then exhibited by the magnet-controlled detent members.

According to another feature of the invention, the device for computing amounts on which a tax or discount is due is provided with different computing devices corresponding to respectively different amounts, these devices being selectively operable by means of selector keys and cooperating with multiple selector switches and corresponding circuits for computation in accordance with respectively different rates of tax or discount, the switches being connected with scannable magnets in the manner mentioned above.

The foregoing and further objects, advantages and features of my invention, said features being set forth with particularity in the claims annexed hereto, will be apparent from the following in conjunction with a description of embodiments of machines according to the invention illustrated by way of example on the accompanying drawings in which:

FIGS. 4, 5 and 6 exemplify respective sales checks as may be issued by the machine.

Figure 7:
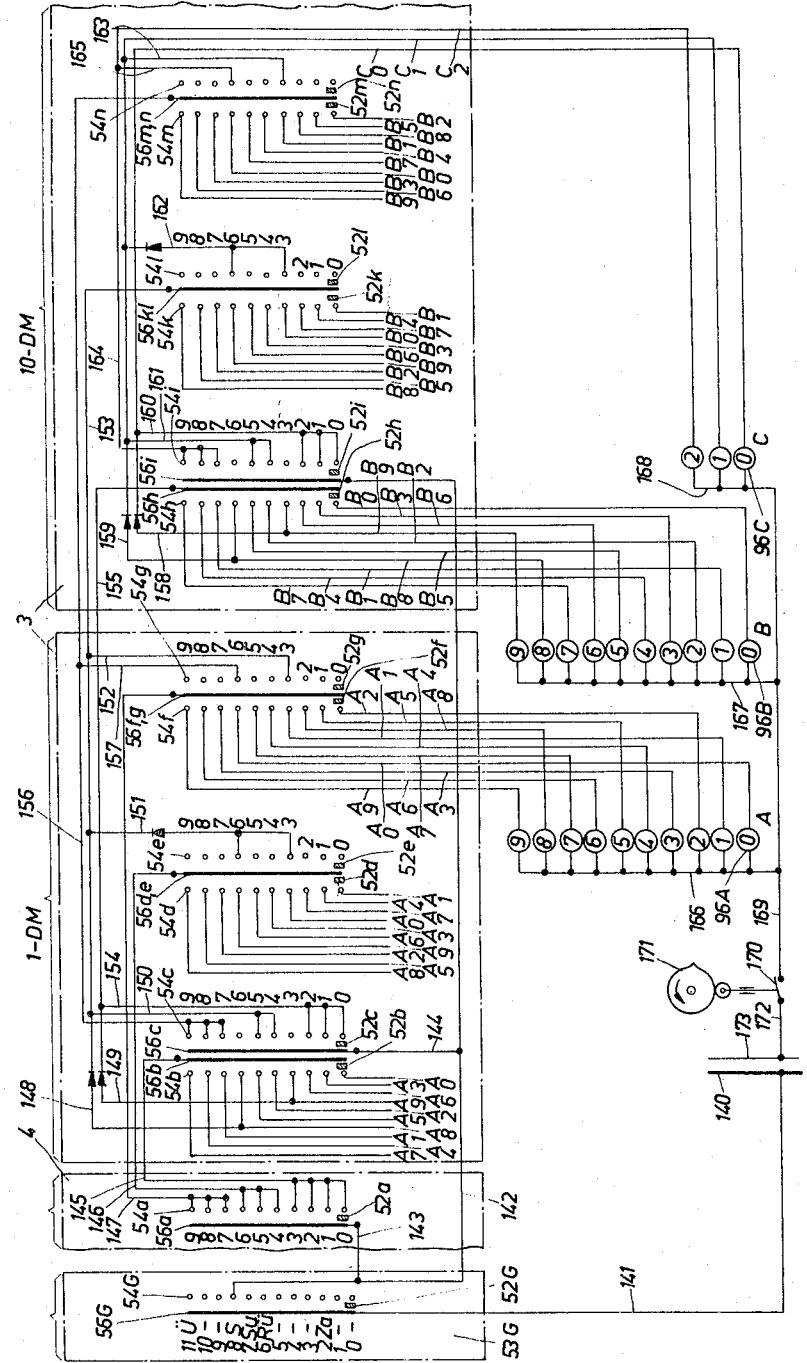

FIG. 7 is a schematic electric circuit diagram of the machine.

Figure 8:
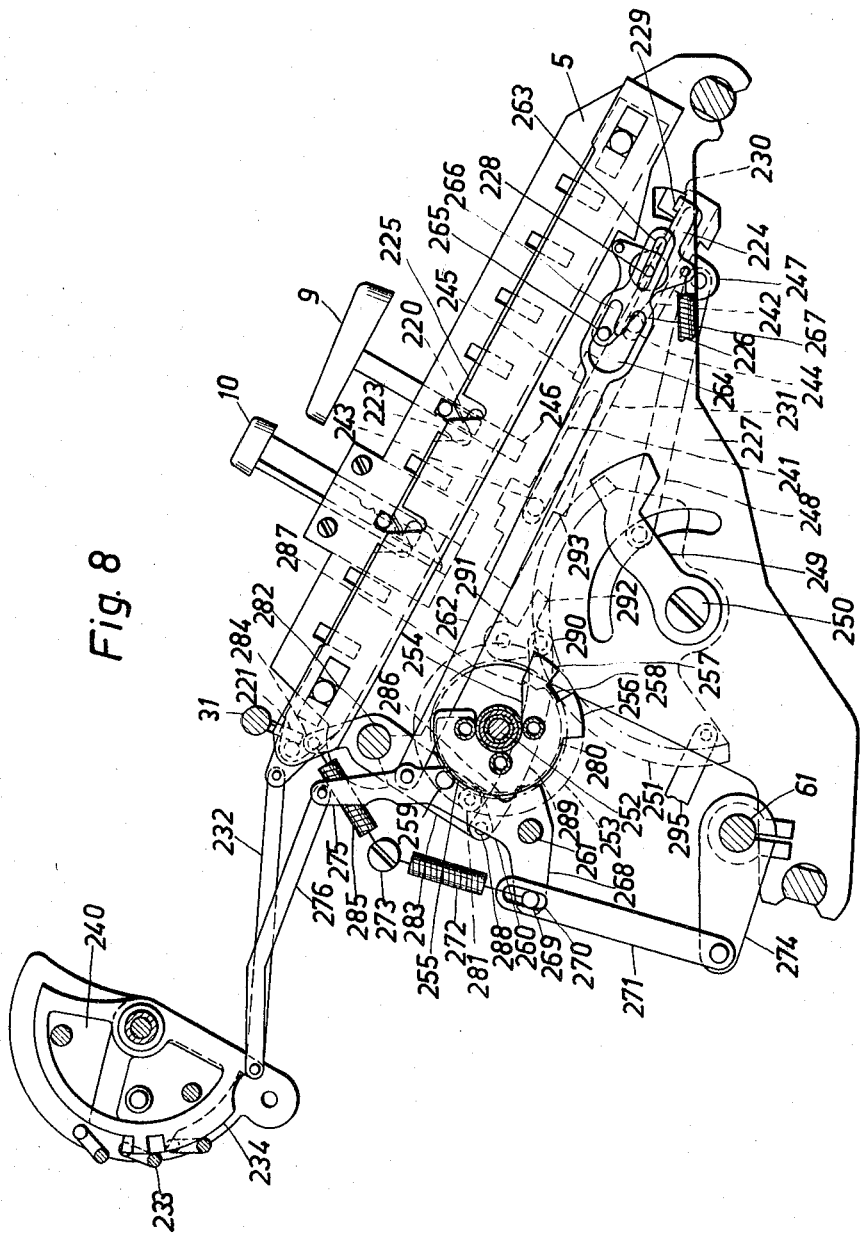

FIG. 8 is a lateral view of one of the mode-of-operation control key banks.

Figure 9:
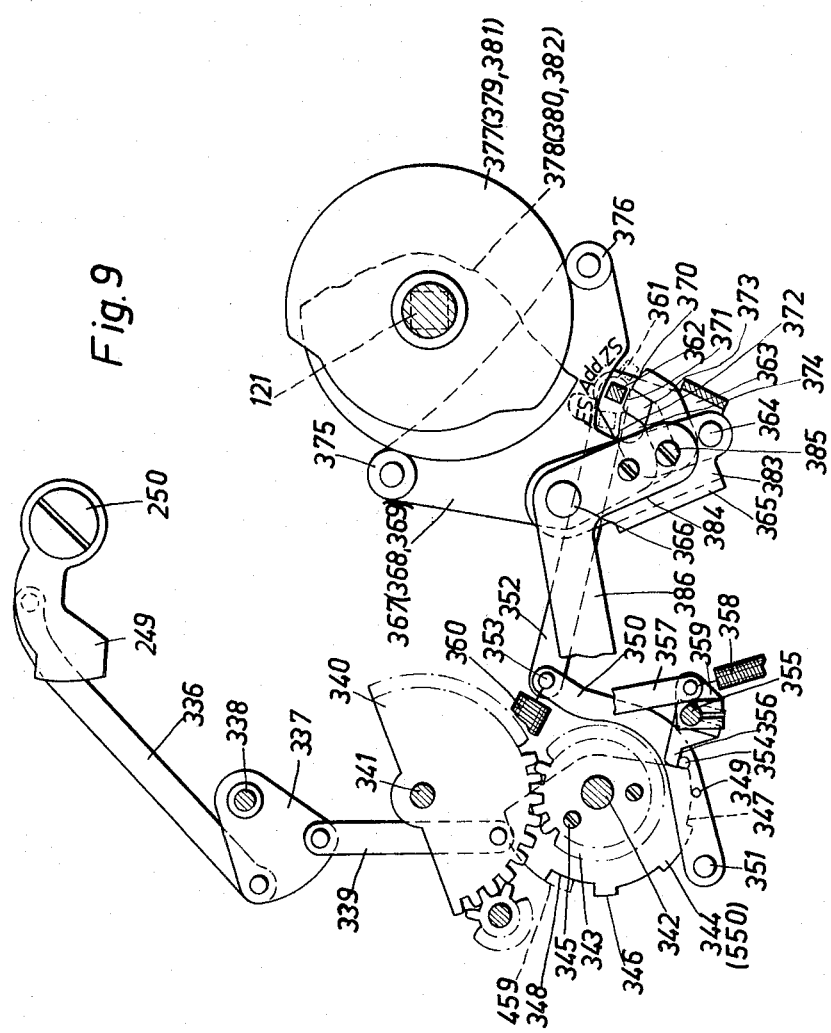

FIG. 9 shows separately an automatic mode control device for one of the control key banks such as the one shown in FIG. 8.

Figure 10:
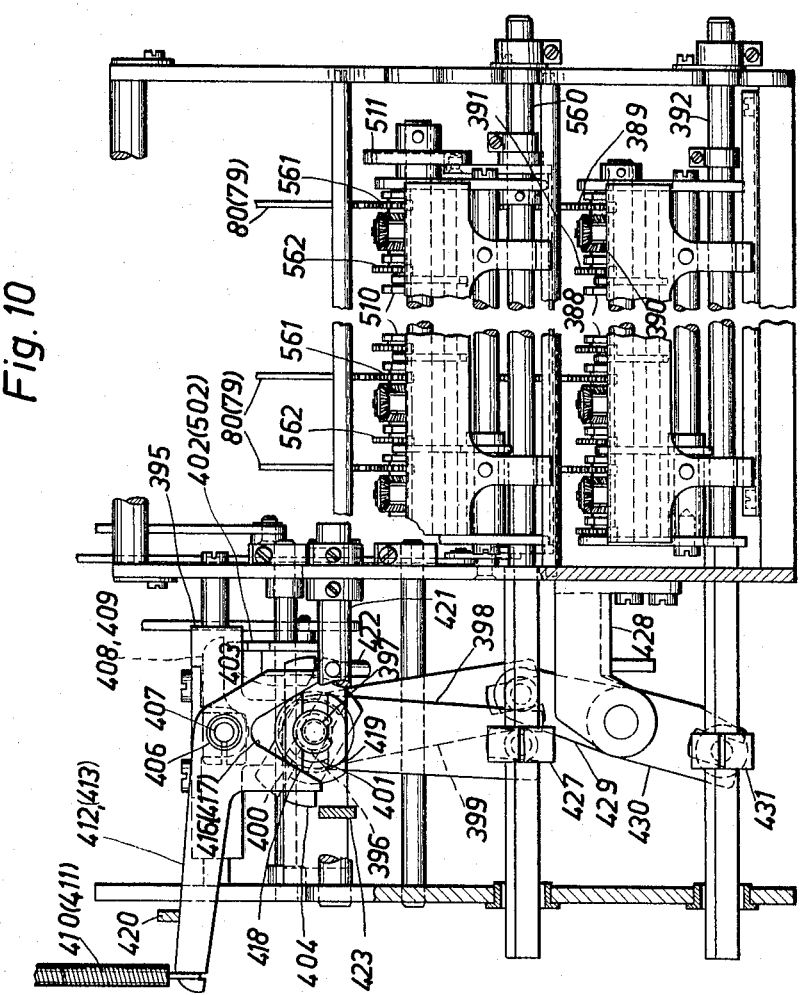

FIG. 10 is a front view of an alternative embodiment of a computer assembly applicable in a machine according to the invention.

Figure 11:
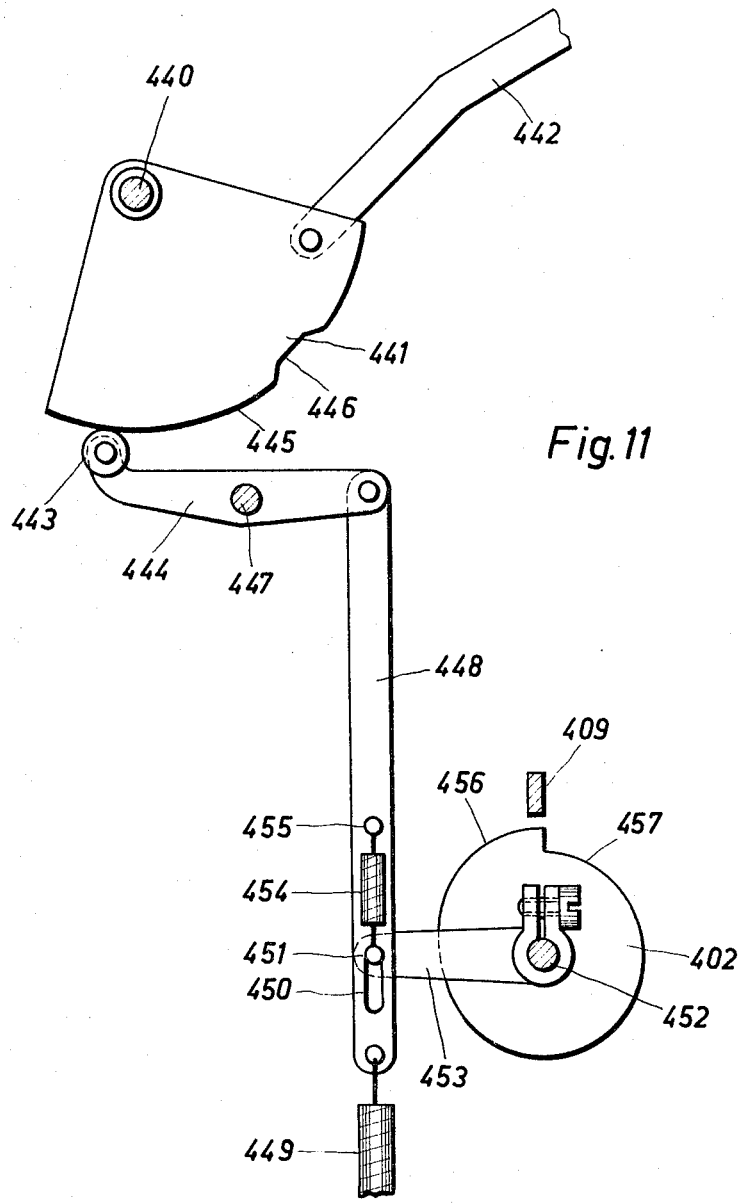

FIG. 11 shows details of control members contained in the computer assembly according to FIG. 10.

Figure 12:
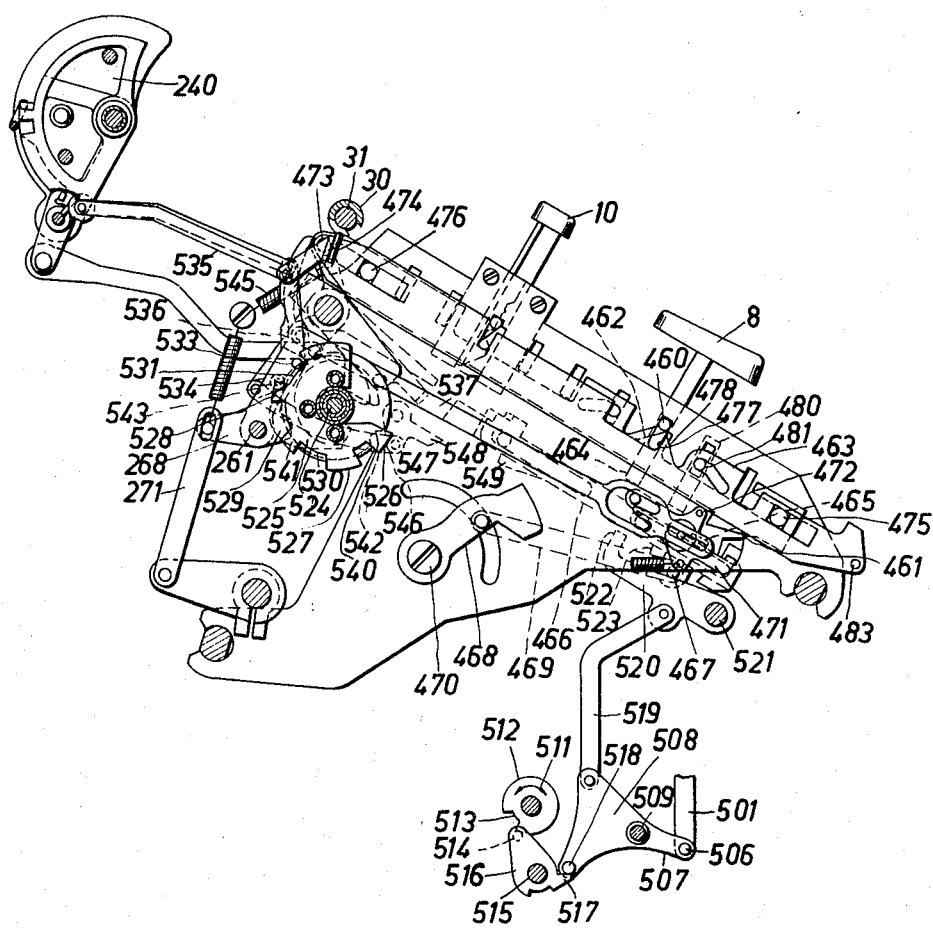

FIG. 12 is a lateral view of a modified operation control key-bank assembly applicable in lieu of the bank shown in FIG. 8.

Figure 13:
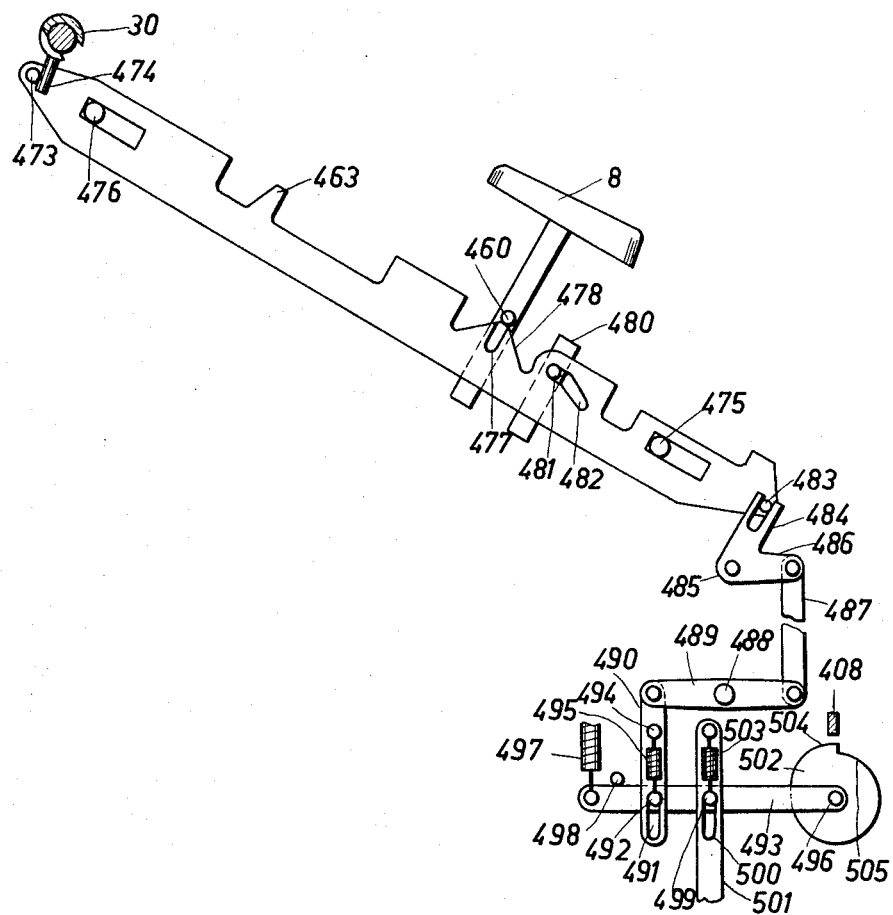

FIG. 13 is a lateral view of computer displacement control means which form part of the assembly shown in FIG. 12.

FIGS. 14, 15 and 16 show details of subassemblies and components which form part of the assembly illustrated in FIGS. 12 and 13.

Figure 17:
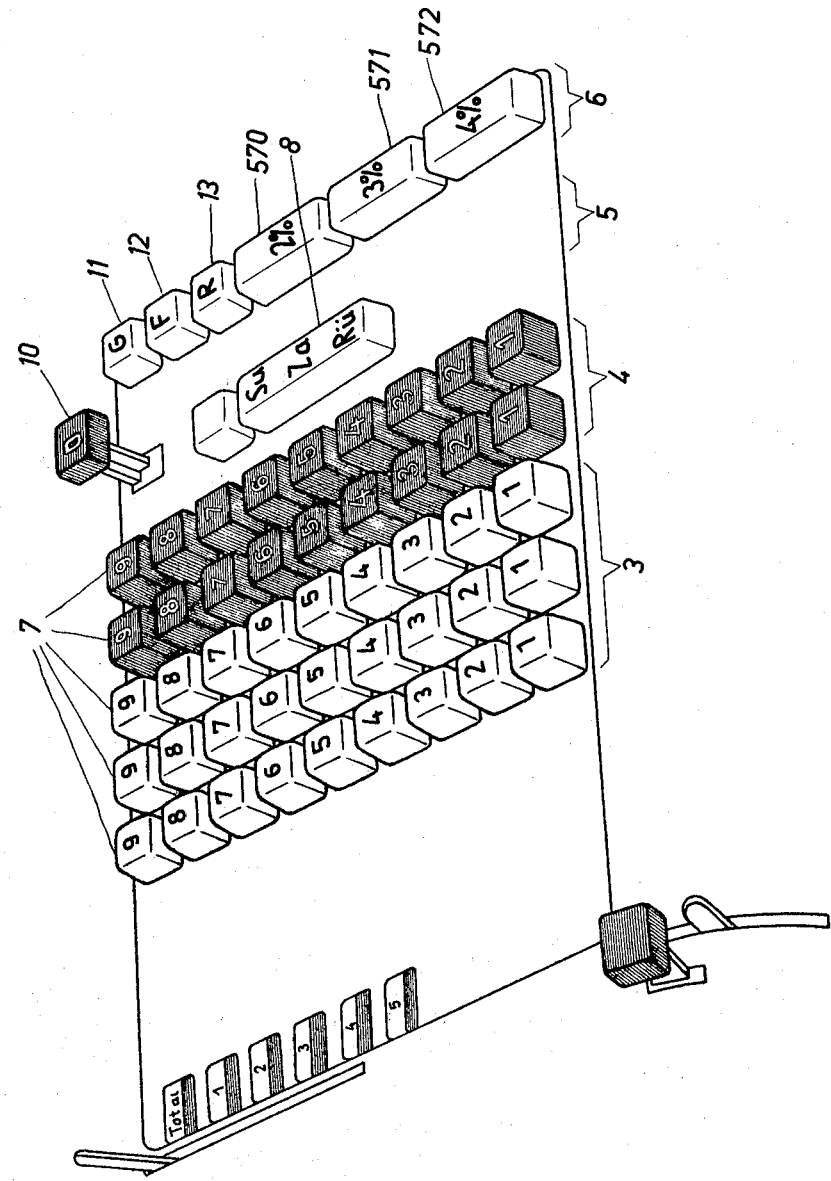

FIG. 17 is a perspective top view of a keyboard relating to still another embodiment.

FIG. 18 shows schematically a selector switch circuit of the same embodiment; and FIGS. 19, 20 and 21 show further details of the latter embodiment.

Figure 1:
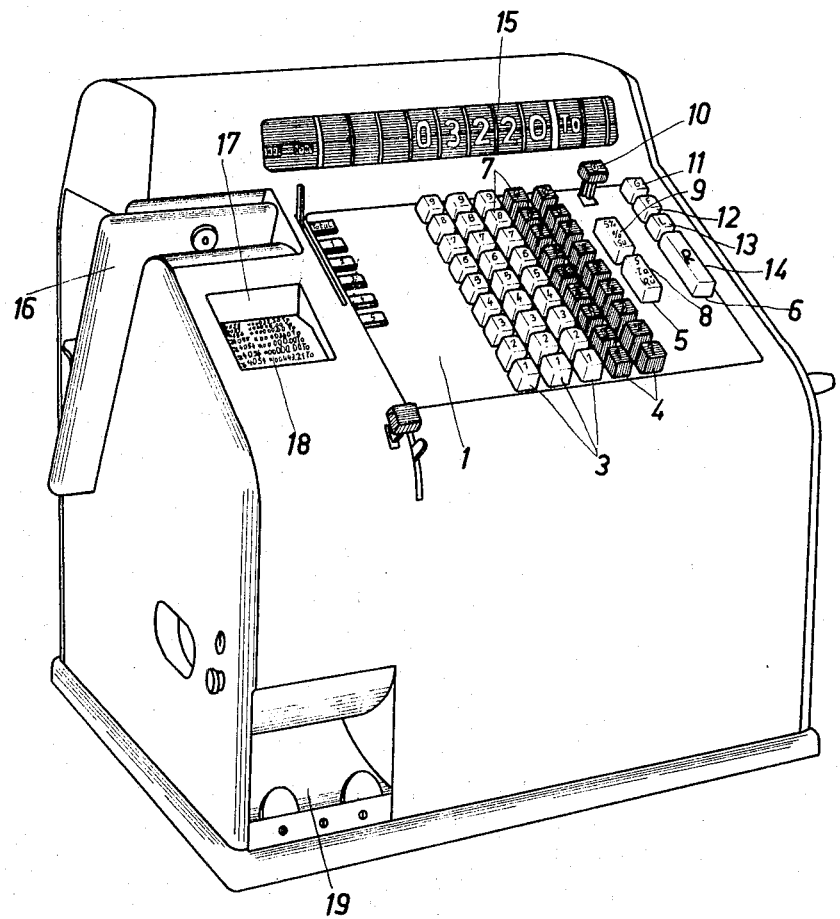
FIG. 1 shows a cash register in perspective representation.

The keyboard 1 of the cash register 2 illustrated in FIG. 1 comprises amount key banks 3 and 4 for dollar amounts and cent amounts, a bank 5 of control keys for selecting the mode of operation such as a subtotalizing or totalizing machine run, and a bank 6 of selector keys for the selection of a group of adding mechanisms serving to separately register specified groups of items such as sales made in respectively different departments of a retail store. Each of the amount key banks 3, 4 has a vertical row of nine keys 7 (FIGS. 1, 2) for the posting of monetary values in decimal digits. The control key bank 5 comprises control keys 8, 9 and a lockable key 10 (FIGS. 1, 8, 12). The adding-mechanism selector bank 6 is shown to comprise keys 11, 12 and 13 (FIG. 1) for items on which no tax or discount is due, as well as a special key 14 for selecting an adding mechanism to enter items on which a tax or discount is due. Located above the keyboard is an indicator 15, and at the left thereof a slot 16 for the insertion of vouchers and the like. The machine housing has a window 17 beneath which a recording tape 17 is visible. An opening 19 framed between guide sheets in the lower portion of the housing serves to issue the sales checks imprinted in the machine.

The shanks 20 (FIG. 2) of the spring-loaded keys 7 in the amount key banks 3 and 4 carry respective cross pins 23 which are guided in respective slots 21 of a cover sheet 22 and act upon inclined edges 24, 25 of a key slider 26 and an arresting slider 27. The key slider 26, whose functioning will be explained hereinafter with reference to a particular embodiment, carries a riveted pin 28 which acts upon a pin 29 on a control bridge 30 rotatably mounted on a release control shaft 31. When any one key 7 is actuated, the slider 26 is moved to the right in FIG. 2 and thus causes the pin 28 to entrain the pin 29 thereby turning the bridge 30 counter-clockwise.

The key shanks 20 are engageable with projections 32 of a slider 33 which forms part of a differential mechanism. The slider 33 has longitudinally elongated slots by means of which it is guided on pins 34, 35. The lower end of slider 33 has a projection 36 to which a lever 37 is linked. Lever 37 is rotatably fastened to the feeler lever 38 of the differential mechanism 40, whose design and performance are generally known (U.S. Patents 3,066,861 and 3,076,595).

Each of the individual amount key banks 3 and 4 has its own differential mechanism 40, and each of these mechanisms possesses a gear segment 41 (FIG. 2) meshing with one of the spur gears 43 fastened on respective telescoping hollow shafts. The telescopic assembly of hollow shafts 42 transmits the adjusting motion to the printing mechanism of the cash register. Since such printing mechanisms and hollow shaft assemblies are well known as such and their details are not essential to the invention proper, they are not further illustrated and described herein. If desired, reference in this respect may be had to U.S. Patents 2,579,536 and 2,690,710.

A link 44 is pivotally attached to the gear segment 41 and acts upon a lever arm 45 of a gear segment 46 which serves to adjust the number-carrying cylinders 47 and 48 of the indicator 15 (FIG. 1). A lateral portion 49 of link 44 (FIG. 2) carries a pin 50 cooperating with an insulating control member 52 which is rotatable on a pivot pin 51 and forms part of an electrical selector switch 53 whose fuctioning will be explained in a later place. The selector switch has a movable slide contact 56 and ten fixed bank contacts 54 coordinated to the positions 0–9 of movable contact 56.

An aligning lever 60 cooperates with a gear segment 41 of the differential mechanism 40. The lever 60 is fastened to a shaft 61 journalled in the machine frame structure and has a lever arm 62 linked by a rod 63 to one arm 64 of a three-armed member 65 which carries two follower rollers 66 and 67. The rollers engage respective cams 68 and 69 fastened on the machine main shaft 121. A feeler lever 38 of the differential mechanism 40 is further linked by a pull rod 70 to a pin 71 on an arm 72 of a three-armed lever 74 pivoted on a fixed pin 73.

Another pull rod 77 is linked by a pin 75 with an arm 76 of lever 74 and serves to adjust three control segments 78, 79, 80 connected with the rod 77 by respective pins 81, 82, 83. Each of the control segments 78, 79, 80 has one or two spur-gear sectors engageable by the input members of various computing register mechanisms, namely an adding (summing) mechanism 110 engageable with segment 80 and shown so engaged in FIG. 2, a main adding (totalizing) mechanism 115 engageable with segment 79, another adding mechanism 120 for items subject to tax or discount which is engageable with segment 78, and a grand-total computer mechanism 510 for furnishing the ultimate balance, the latter being engageable with segment 79. As will be further explained, the respective computing mechanisms are selectively shifted into engagement with the segments under control, or primary control, by the selector and control keys and are then driven from the respective sectors to perform the desired computation.

The control segment also meshes with a pinion 86 on a shaft 85. The pinion 86 meshes with a rack 87 of a horizontal feeler bar or follower 89 which is displaceable longitudinally on guides 88. The bar 89 has stops spaced from each other along the bar for cooperation with detent arms 91 on respective control pawls 93 biased clockwise by individual pull springs 92. Each pawl 93 is correlated to the armature 95 of a magnet 96. The armature of each magnet is biased clockwise by a pull spring 94 and normally latches its pawl 93 in the position shown in FIG. 2.

When voltage is applied to any one magnet 96 coordinated to the amount key banks 3 and 4, the appertaining one armature 95 is attracted and releases its pawl 93. The pawl then snaps clockwise about its pivot pin 97 under the force of its pull spring 92, and the detent arm 91 of the pawl enters into the path of the coordinated stop 90 of feeler bar 89 to subsequently arrest the bar in the corresponding position.

Figure 2:
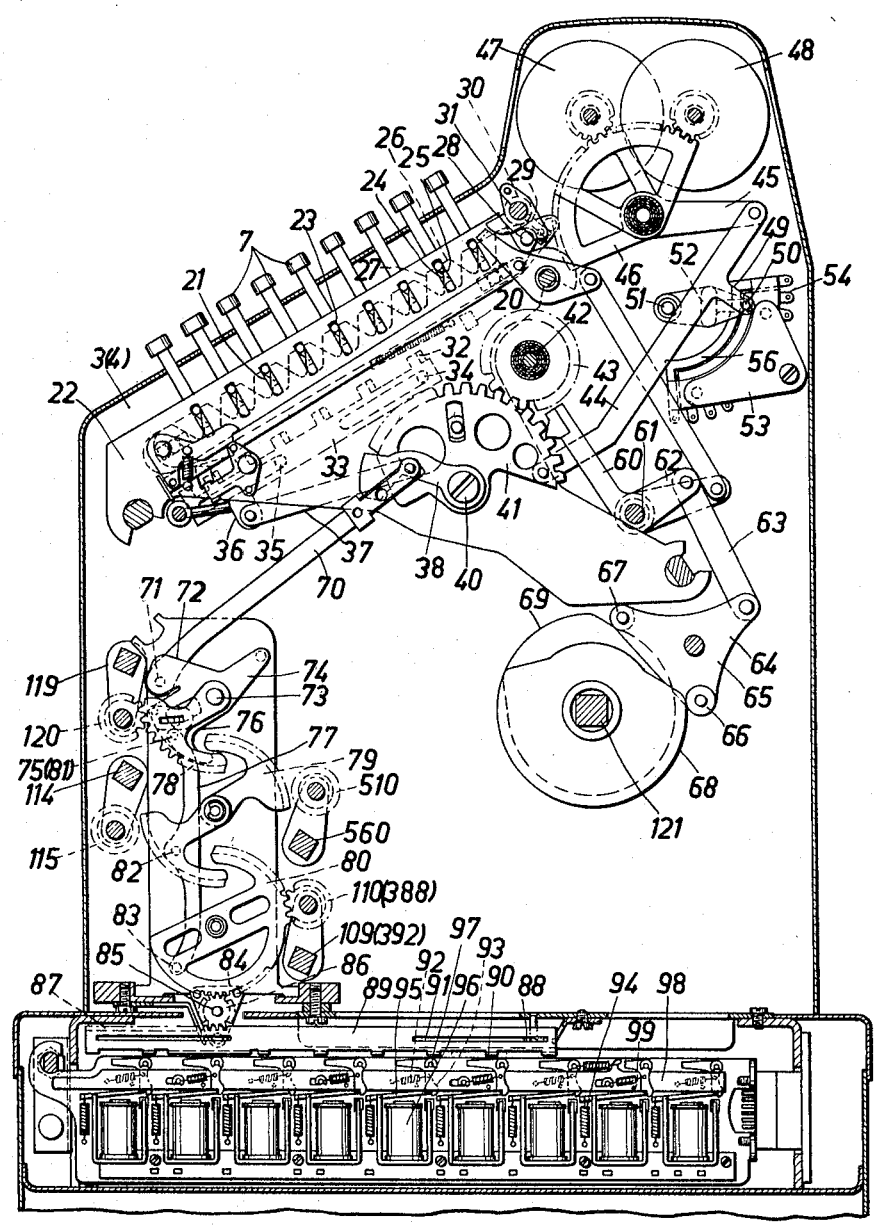
FIG. 2 is a cross section of the same machine seen from the left of FIG. 1.
Figure 3:
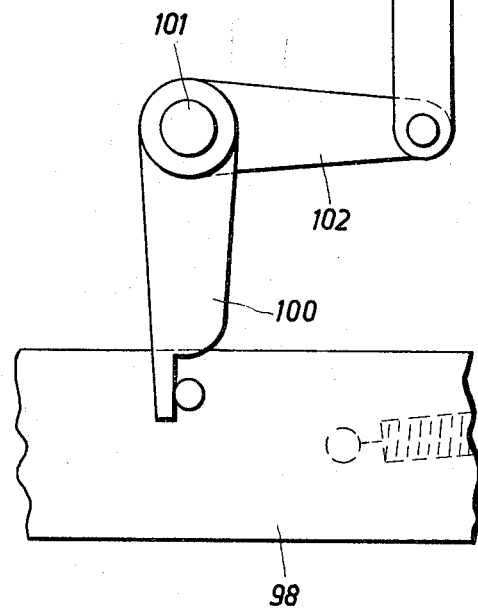
FIG. 3 shows separately the control means for a clearing device which forms part of the machine.

For subsequently clearing the thus adjusted pawls 93, there is provided a pull spring tending to hold a clearing lever 98 in the position shown in FIG. 2. Riveted to each clearing lever 98 is an entrainer pin 99 which moves the pawl 93 back to the latched starting position when the clearing lever 98 shifts to the right relative to FIG. 2. All of the clearing levers 98 are controllable by a fork member 100 (FIG. 3) straddling one side of the feeler bar 98. The fork member is fixed on a clearing shaft 101 which also carries a fixedly mounted arm 102. Arm 102 is joined by a linking rod 103 with an arm 104 on the control shaft 109 (FIGS. 3, 2) of the adding mechanism 110 (FIG. 2). As soon as the adding mechanism 110 is being moved counter-clockwise to the position according to FIG. 2 in which it meshes with the control segment 80, the fork member 100 (FIG. 3) turns counter-clockwise and thus displaces the clearing lever 98 to the right, relative to FIG. 2.

The main adding (totalizer) mechanism 115 is mounted opposite the adding mechanism 110 on a control shaft 114. Another control shaft 119 carries the adding mechanism 120 for receiving the amounts of individual and multiple transaction items subject to tax or discount. Rotation of the control shafts 114, 119 causes the respective adding mechanisms to engage the control segments or to be disengaged therefrom.

The magnets 96 and the electrical selector switches 53 of the amount key banks 3 and 4 are interwired as follows:

It is assumed in the example here described that the amount due on taxable items is to be computed on the basis of a 3% rate and hence results from multiplying the item amount by the rate factor of 3/100. This rate is involved in the examples of transactions represented by the sales checks shown in FIGS. 4 to 6 and more fully explained in a later place. In the illustrated machine, the multiplication with the fractional rate factor is effected by multiplying the sum of the taxable items with the numerator (3) and simultaneously dividing it by the denominator (100) of the rate factor, the result thus obtained being then further processed by the machine.

Accordingly, in the wiring diagram shown by its essentials in FIG. 7, only a single row of fixed sequential contacts 54a is provided for the amount key bank denoting ten-cent values, whereas several rows of fixed switch-contact groups 54b to 54g and 54h to 54n are provided for those amount key banks that denote one-dollar and ten-dollar values and require tens-transfers. These rows of fixed contacts cooperate through movable selector contacts 52a to 52g and 52h to 52n with respective fixed slide contacts 56a to 56g and 56h to 56n. It will be understood that for each individual key bank the above-mentioned contacts correspond to those denoted by 52, 53 and 56 in FIG. 2 described above.

According to FIG. 7, a group of ten electromagnets 96A and 96B is coordinated to each of the amount key banks 4 for the cent and ten-cent banks. These magnets correspond to those denoted by 96 in FIG. 2. Only three such magnets 96C are coordinated to the one-dollar key bank 3. If the machine is to be equipped for higher computed amounts (up to $1,000 or $10,000) the above-mentioned amount key bank 3 for the one-dollar amounts would have to be equipped with up to ten magnets 96, or the key bank 3 for ten-dollar amounts would have to be likewise equipped with magnets 96.

For distinction, the leads extending from the selector switch contacts 54b, 54d, 54f and 54h, 54k, 54m to the magnets 96A, 96B, 96C are denoted by A1 to A9, and by B0 to B9, and C0 to C2. The remaining switch contacts 54a, 54c, 54e, 54g, 54i, 54l, 54n are hereinafter identified by additional indicia 0 to 9.

The operation control key bank 5 is provided with a selector switch having eleven fixed contacts 54G, a fixed slide contact 56G and a movable selector contact 52G.

For example, there will now be described the individual circuit connections which come about when the machine operates to register the transactions exemplified by the printed sales check shown in FIG. 4, involving a taxable total of $40.90. As will be more fully explained, this amount is multiplied in the machine with the numerator and divided by the denominator of the tax-rate factor 3/100, resulting in the amount of $1.22 total tax which is automatically added in the machine to the sum of the non-taxable items, to result in the grand total of $88.54 charged to the customer.

The electric system shown in FIG. 7 is energized from positive and negative current-supply buses 140 and 173.

A lead 141 connects the positive bus 140 with the slide contact 56G. The appertaining fixed selector contact 54G/8 is connected by a manifold lead 142 and branch leads 143 and 144 with the respective slide contacts 56a, 56c and 56i. As shown, each of the groups of fixed selector contacts 54a/0 to 3, 54a/4 to 6, and 54a/7 to 9 is connected by respective manifold leads 145, 146 and 147 to the slide contacts 56b, 56d and e, 56f and g. Manifold leads 148 and 149 extend from respective fixed switch contacts 54b/6 and 54b/3. Lead 148 is connected by branch leads 150, 151, 152, 153 with the fixed switch contacts 54c/4 and 5, 54e/6 and 3, 54g/3 as well as with the slide contacts 56k, l. Manifold lead 149 is connected by leads 154 and 155 with the fixed switch contacts 54c/0 to 2 and with the slide contact 56h. The contacts 54c/7 to 9 are connected by a lead 156 with the slide contact 56m, n. A branch lead 157 connects lead 156 with the fixed switch contact 54g/6. The switch contacts 54h/3 and 54h/6 are connected by leads 158 and 159 to the respective magnet-energizing leads C0 and C1. The energizing lead C0 for magnet C0 is connected through a lead 160 with the switch contacts 54i/0 to 2. The corresponding magnet lead C1 is connected by branch leads 161, 162 and 163 with fixed switch contacts 54i/4 to 5, 54l/3, 54l/6 and 54n/3. The magnet lead C2 is connected through lead 164 with fixed switch contacts 54i/7 to 9 and through another lead 165 with switch contact 54n/6.

The magnets 96A, 96B and 96C are connected by respective manifold conductors 166, 167, 168 with a negative bus 169 which is connected under control by a switch 170 and a connection 172 with the negative feeder bus 173. Switch 170 is controlled by a cam 171 driven synchronously from the machine main shaft 121 (FIG. 2).

Before explaining how the above-described circuit components and connections cooperate in producing the result manifested by the above-mentioned example of the sales check shown in FIG. 4, it will be necessary to describe details of other machine components that enter into such cooperation.

The control key bank 5, separately shown in FIG. 8, is provided with a release slider 220, an arresting or interlock slider 223 controlled by a pin 221 of the release shaft 31, and a slider 225 acting upon a zero pawl 224. When the control key 9 or the lockable key 10 is being depressed, the slider 225 is displaced and turns the zero pawl 224 counterclockwise about its pivot pin 228 fastened on the side wall 227 of the key-bank sub-assembly, the zero pawl being biased by a pull spring 226. The counter-clockwise rotation of a zero pawl lifts its latch nose 229 away from the path of a stop portion 230 which forms part of a slider 231 for controlling the differential mechanism of the control-key bank. The release slider 220 cooperates through a linking rod 232 with one of the blocking discs 234 which control the control members 233 of a blocking or interlocking assembly 240. This assembly is only partially illustrated because its design and performance are known as such. Reference in this respect may be had to German Patent 964,905. The release slider 220, the arresting slider 223 and the zero-pawl slider 225 are normally held in the positions shown in FIG. 8 by means of springs (not illustrated).

The slider 231 for the differential mechanism has longitudinal slots 241, 242 riding on respective guide pins 243, 244 fastened to the side wall 227. A projection 245 of slider 231 cooperates with the shank 249 of control key 9. A linking rod 248 pivotally joined with an extension 247 of slider 231 is connected with the feeler lever 249 of the differential mechanism 250 for the control-key bank 5.

The differential mechanism 250 possesses a gear segment 51 meshing with a spur gear 253 on a shaft 252. The spur gear 253 is rigidly joined with a cam 254 whose cam lobes 255, 256, 257 and 258 cooperate with a feeler pin of a follower lever 260. The follower lever or feeler 260 is fastened on a shaft 261 journalled in the machine frame structure. A rod 262 linked to the follower 260 has a slot 263 by means of which it is displaceable on the above-mentioned pin 228. The rod 262 has a W-shaped recess 264 cooperating with the pin 265 of the zero pawl 224 in such a manner that the pin 265, in the starting position shown in FIG. 8, can freely move upwardly and downwardly, but, when the linking rod 262 is shifted to the left in FIG. 8, is arrested by the slot 266 in the position then occupied so that it can no longer be swung to the other position.

The follower lever 260 has an arm 268 with a pin 269 straddled by a longitudinal slot 270 in a linking rod 271. A pull spring 272 has one end attached to the pin 269, the other end being held fixed by a screw bolt 273. The spring biases a follower lever 268 and the follower shaft 261 with the feeler lever 260 in the clockwise direction. The linking rod 271 is pivotally joined with a lifting arm 274 firmly clamped on the above-mentioned shaft 61 (FIGS. 8, 2).

The laterally bent, upper end 275 of the feeler lever 260 (FIG. 8) is pivotally joined by a linking rod 276 to one of the locking discs 234 of the above-mentioned blocking or interlocking assembly 240.

Riveted to the gear segment 253 is another control cam 280 which cooperates with a follower roller 281 of a lever 283 rotatable on the shaft 282. A pull spring 285 acts upon an extension 284 of the follower lever 283 and holds the roller 281 in contact with the contour 286 of control cam 280. The circular cam contour 286 is interrupted by a recess 287 which, in a suitable position of the cam, affords rotation of the follower lever 283 in the counterclockwise direction. A curved rod 289, pivoted to a pin 288 of the follower lever 283, is connected with an arm 290 of a bell crank lever 291 which has a stop arm 292 for coaction with an abutment 293 on the differential-mechanism slider 231 when the stop arm 292 is swung to the proper position.

A linking rod 295 is pivotally connected with the gear segment 251 of the differential mechanism 250 and acts upon the appertaining number cylinders 47 and 48 of the indicator 15 (FIGS. 2, 1) in the same manner and by means similar to those already described with reference to the corresponding differential mechanism 40 of the amount keyboards 3 and 4 shown in FIG. 2. The linking rod 295 also serves to adjust the movable switch contact 52G (FIG. 7) of the selector switch 53G coordinated to the control key bank.

The automatic means for controlling the mode of operation (addition, sub-totalizing and grand-totalizing) by swinging the adding (summing) mechanism 110 (FIG. 2) or the respective mechanisms 115 and 120 into meshing engagement with the corresponding control segments, is designed as follows:

A pull rod 336 is linked to the feeler lever 249 (FIGS. 8, 9) in the differential mechanism 250 of control key bank 5 and is pivotally connected with a control lever 337 journalled on a fixed pivot pin 338. The control lever 337 acts through a link 339 to displace a gear segment 340 about a pin 341 (FIG. 9). Segment 340 meshes with a spur gear 343 fastened on a control shaft 342. A control segment 344 seated on control shaft 342 is joined by screws 345 with a coaxial spur gear 343 and has a circular contour 346 for controlling sub-totalizing machine runs. The contour 346 is interrupted by rectangular recesses whose arcuate bottom is differently spaced from the axis of the control shaft 342. The arcuate bottom contours denoted by 347 control addition machine runs, and those denoted by 348 control grand-totalizing machine runs. A feeler pin 349 of the follower lever 350 cooperates with the cam contours 346 to 348. The follower is pivoted on a stationary pin 351 and is pivotally joined at 353 with a control rod 352. A pin 354 riveted to the follower 350 is acted upon by a control lever 356 fastened on the control shaft 355. When the control lever 356 is rotated counter-clockwise, relative to FIG. 9, the feeler pin 349 is lifted off the particular cam contour 346 to 348 so that the control segment 344 can be turned.

The control lever 356 is displaced by a control cam synchronously driven from the machine main shaft 121. This control cam (not illustrated) acts upon the control shaft 355 through a link 357 and a lever 359 biased by a pull spring 358. Another pull spring 360, having one end stationarily fixed, has its other end attached to a pin 353 of the control rod 352 whose right-hand end 361 is connected with a shaft end (not illustrated) of a square coupling shaft 362. The coupling shaft 362 is journalled on a bridge 363 rotatably mounted on the bearing pin 364 of a control bridge 365. The control bridge 365 is fastened on a shaft 366 rotatably journalled in the machine frame structure. Swing levers 367, 368 and 369 are loosely journalled on the shaft 366 and have respective mutually adjacent U-shaped portions 370, 371, 372 individually capable of cooperating with the square coupling shaft 362 by straddling the shaft. The stop portions 370 and 371 are interrupted by respective recesses 373, 374, so that only one of the stop portions 370, 371 or 372 can coact with the coupling shaft 362 at a time, and the two other swing levers are not impeded with respect to their different swinging motions.

The swing levers 367, 368 and 369 are driven through cam-follower rollers 375, 376 . . . from pairs of cams 377, 378 and 379, 380 and 381, 382. Cam pair 377, 378 serves to control sub-totalizing machine runs. Cam pair 379, 380 controls addition machine runs, and cam pair 381, 382 controls grand-totalizing runs. A bell crank lever 384 is fastened by a screw 385 on the forward leg 383 of the control bridge 365 and has an arm 386 acting upon the mode control rails of the conventional type (not illustrated) by means of which the driving movements issuing from the curve pairs 377, 378 or 379, 380 or 381, 382, are transmitted to the control shafts 109, 114 and 119 respectively, which then place the selective summing mechanism 110 or the selected adding mechanisms 115 or 120, in the rhythm of the particular operating mode, into meshing engagement with the corresponding gear segments 78, 79 or 80.

The devices for the different selection of the individual computing mechanisms, the drives for the differential mechanisms 40 and 250, as well as the main machine drive itself, are known as such, and for that reason not further described herein.

The performance of the devices so far described will now be explained with further reference to the transaction operation manifested by the above-mentioned sales check 130 shown in FIG. 4.

The first item to be registered involves the amount of $25.36. This amount is posted by means of the keys 7 in the amount-key banks. Then the desired one adding-mechanism selector key 11, 12 or 13 is depressed. Thus, the posted amount is entered into the selected summing mechanism 110 as well as into the main adding (totalizer) mechanism 115. The following item in the amount of $13.50 is then posted and entered in the same manner. The next item of $27.41 is subject to tax and is therefore posted or entered while the corresponding special selector key 14 is also depressed. Consequently, aside from entering the amount into the summing mechanism 110 and into the main adding mechanism 115, this amount is simultaneously entered into the special adding mechanism 120, thus remaining stored in each of these three computing mechanisms. The two following non-taxable amounts of $3.10 and $0.18, as well as the taxable amount of $13.17 are analogously entered into the above-mentioned computing mechanisms. Since for these operations none of the keys in control key bank 5 is to be actuated, the position of the control segment 344 (FIG. 9) is not changed so that the machine, when any one of the adding-mechanism selector keys 11 to 14 is depressed, will always perform a run in the addition mode.

For terminating the transaction, the attendant actuates the control key 9 in bank 5 which, by operation of the release slider 220 and the cooperating blocking 240, releases a machine run for determining the taxable sub-total. When this machine run commences, the feeler lever 249 (FIG. 8) in differential mechanism 250 of control key bank 5 starts rotating and displaces the slider 231 to the left, relative to FIG. 8, until the extension 245 of the slider abuts against the shank 248 of the depressed control key 9. During the feeling operations, the feeler lever 260 is lifted off the control cam 254 by means of cams 68, 69 (FIG. 2). Thereafter the gear segment 251, the cam 254 connected therewith and the control cam 280 are turned to the position determined by the position of the now arrested slider 231, and the feeler lever 269 is again released so that its feeler pin 259 now engages the outermost contour 256 of the control disc 254.

As the machine run was released, the zero pawl slider 255 had swung the zero pawl 224 counter-clockwise so that the pin 265 of pawl 225 became arrested by the slot 267 of rod 262 (FIG. 8). The zero pawl 224 is kept blocked in this position until, during one of the next following machine runs, another displacement of rod 262 toward the right, relative to FIG. 8, takes place. Then the pull spring 226 returns the zero pawl 224 to the starting position shown in FIG. 8. However, the feeler lever 283 of control cam 280 does not change its position because its follower roller 281 is prevented from performing any additional movement since the roller 281 is now stopped by the cam contour 286 in the new position occupied.

When the feeler lever 249 of the differential mechanism 250 commences turning, the control segment 344 (FIG. 9) is also turned until its contour 348 is opposite the feeler pin 349. The lever 350 carrying the pin 349 sets the machine for the grand-totalizing run. After the mode selector means and the adding mechanism selector means are adjusted, the special adding mechanism 120 (FIG. 2) for taxable items is shifted into meshing engagement with the control segments 78, whereas the summing mechanism 110 and the main adding mechanism 115 remain disengaged. The feeler levers 38 of the differential mechanisms (FIG. 2) of the amount key banks 3 and 4, these feeler levers being released after commencement of the machine run, act during the first half of the run, to turn the control segments 78 clockwise to such an extent that the individual computer gears are set to zero.

Now the sum of the taxable entries in the total amount of $40.90 thus taken off the special adding mechanism 120 is imprinted upon the sales check 130 in the known manner. As soon as all feeler levers 38 have occupied their read-out (scanning) positions, the gear segments 41 of the differential mechanism 40 are rotated into the positions now determined by the feeler levers 38 respectively and are then latched in these positions. The positions of the respective gear segments 41 determine the positions of the corresponding number cylinders 47 and 48 (FIG. 2) and the position of the control members 52, so that when the machine run is terminated, the indication of the sub-totalizing machine run and the adjustment of the control members 52 remains preserved.

When the second half of the machine run commences, the special adding mechanism 120, reset to zero, is again moved to its starting position, and the feeler levers 38 are constrainedly returned to their respective starting positions according to FIG. 2. The gear segment 251 of the differential mechanism 250, as well as the gear segments 41 of the differential mechanisms 40, then operate to establish the following circuit connections, apparent from FIG. 7, for determining the amount of tax due on the just-previously computed sum of taxable items.

As described, the sum drawn from the special adding mechanism 120 was the taxable total of $40.90. Accordingly, the movable contacts 52 of the selector switches 53 now occupy the following positions: Movable switch members 52G of control key bank 5 occupies the position 8. Movable switch member 52a of the ten-cent bank is in position 9. Each of the movable switch members 52b to 52g of the $1.00 key bank remains in position 0. The switch members 52h to 52n of the $10.00 key bank are placed in position 4.

When the switch 170 (FIG. 7) is closed by operation of cam 171, the following circuits are completed between the positive and negative feeder buses 140 and 173.

(1) Magnet 96A/2 is energized in the circuit 140–141–56G – 52G – 54G/8 – 142 – 143 – 56a – 52a – 54a/9–147–56fg–54f/0–A2–96A/2–166–169–170–172–173.

(2) Magnet 96B/2 is energized in the branch circuit 142 – 144 – 56c–52c – 54c/0 – 154, 155 – 56h – 52h–54h/4–B2–96b/2–167–169.

(3) Magnet 96C/1 is energized in the circuit 142–56i–52i–54i/4–161–159–C1–96C/1–167–169.

The magnets 96A/2–96B/2 and 96C/1 are thus energized simultaneously for a short interval of time. They attract their respective armatures 95 (FIG. 2) which release the pawls 93 whose detent arms 91 are thus swung into the path of the feeler bar 89 so that each swung-out arm 91 can cooperate with the corresponding stop 90 of bar 89 during the next following machine run.

This completes the sum drawing operation for determining the total of taxable items during which run this sum is multiplied with the numerator of the tax factor and is simultaneously divided by the denominator.

It will be remembered that the follower lever 260, whose feeler pin 259 engages the cam contour 256, acts through the link 276 to displace the appertaining blocking disc 234, thus releasing the corresponding control bridge member 233 which automatically releases a subsequent machine run without further manual actuation of any key.

This fully automatic machine run is to operate so that the tax in the amount of $1.22, now manifested by the joint actuation of magnets 96/A, 96/B2 and 96C/1, is additively entered into the summing mechanism 110, and indicated and printed. During this machine run, the differential mechanism slider 231 not blocked by the arrested zero pawl 224 shifts up to the position 11 (FIGS. 7, 8) where it is arrested by a stop (not shown). As a result, the control segment 344 is turned until its cam contour 347 is opposite the feeler pin 349, thus setting the machine to the mode "addition." Thereafter, the gear segment 251 is turned a further amount and shifts the control disc 254 and cam 280 to a position in which the pin 259 of follower lever 260 coacts with the contour 357 of control disc 254, thus preparing another automatically releasable machine run.

The control cam 280 is simultaneously displaced so that the follower roller 281 of lever 283 can enter into the recess 287 as soon as, during the return travel of the differential mechanism slider 231, the bell crank lever 291 can turn counter-clockwise relative to FIG. 8.

As the summing mechanism 110 is being selected in known manner, the released feeler levers 38 of the differential mechanisms 40 (FIG. 2) displace the feeler bars 89 to the right with the aid of the pull rods 70 and 77, the control segments 80 and the pinions 86. The travel of the feeler bars 89 to the right, relative to FIG. 2, is terminated when the stops 90 of the bars 89 are arrested by the magnetically controlled arms 91. These positions correspond to the value of $1.22. In the second half of the machine run, during which the feeler levers 38 are turned back, the control segments 80 transfers this amount into the summing mechanism 110 which in the meantime has been turned into meshing engagement with the segments 80 (FIG. 2). Before termination of the machine run the summing mechanism 110 is swung out of engagement and, when the scanning operation is completed, the stop pawls 93 are returned to the latched starting position shown in FIG. 2 by the action of the release lever 98.

Now the previously prepared grand-totalizing machine run is automatically released by the control disc 254 coacting with the follower lever 260. The ensuing shifting travel of the differential mechanism slider 231 is stopped when its shoulder 293 (FIG. 8) abuts against the stop arm 292 of the lever 291. The slider 231 is now in a position corresponding to position 7 according to FIG. 7 and, thus positioned, again selects the summing mechanism 110. Furthermore, the control segment 344 (FIG. 9) is adjusted to the position in which its cam contour 348 is opposite the feeler pin 349, thus controlling the machine to perform a grand-totalizing run. During this machine run, the summing mechanism 110, after adjustment of the automatic control and selecting means, is swung into meshing engagement with the gear segments 80. The ultimate amount of $88.54 is taken out of the summing mechanism 110, printed upon the sales check 130 (FIG. 15) and also exhibited in the indicator 15 (FIG. 1).

Since the exact amount of the tax is $40.90×3/100 =$1.227, the circuitry shown in FIG. 7 may be extended so that when the third decimal position at the right of the decimal point is larger than four, the second decimal position is rounded off by increasing it one unit.

During the machine runs in which posted amounts are entered into the above-described registering devices, the business transactions can be additionally entered into the main adding mechanism 115 and the other subsidiary adding mechanisms (not illustrated, but corresponding to mechanism 110); and at the close of a business day the amounts and the total thereof can be read off upon actuation of the normally locked key 10, whereafter all registers, as a rule, are reset to zero.

As mentioned, the machine devices so far described may also be utilized for determining and processing amounts of discount. This requires a few modifications described presently.

FIG. 5 illustrates an example of a sales check 131 exhibiting various sales items which are subject to discount. The sum of all of these discount items is $40.90 which, at a rate of 3/100, corresponds to an amount of $1.22. While these two amounts correspond to those involved in the example of the sales check 130 shown in FIG. 4, it is now necessary to deduct the amount of $1.22 from the previously determined sum of $40.90.

For this purpose, the summing mechanism 110 according to FIG. 2 is substituted by an adding-subtracting mechanism 388 according to FIG. 10. Such a mechanism, known as such, is essentially a reversible counting register and is briefly called "add-sub" mechanism. Each decimal position of the add-sub mechanism 388 has a counting gear 389 for positive values and a counting gear 391 for negative values. The negative gear 391 is connected with the positive gear 389 by a differential gearing 390. For that reason, the entering of values into the add-sub mechanism 388 by means of the above-described control segments 80 always takes place in the positive direction, namely in the clockwise sense relative to FIG. 2, regardless of whether an addition or a subtraction is involved. For subtraction, however, the add-sub mechanism 388 must be axially displaced by means of a control shaft 392, until the negative counting gears 391 mesh with the control segments 80.

The device for thus displacing the computing mechanisms 388 is designed as follows.

A stationary bearing block 395 (FIG. 10) fastened to the frame structure has two journal bores. One bore carries a pivot shaft 397 surrounded by a sleeve 396. Those ends of the sleeve 396 and of the shaft 397 that face away from the observer of FIG. 10, are riveted together with respective levers 398 and 399 and the other ends, facing the observer in FIG. 10, are provided with respective bearing members 400 and 401 for journalling respective control bridges 403 and 404. The second journal bore of bearing block 395 rotatably accommodates a pivot shaft 407 surrounded by a sleeve 406. Sleeve 406 and shaft 407 are connected with respective feeler levers 408 and 409. The forward ends of sleeve 406 and shaft 407 are riveted together with respective switching levers 412 and 413 each biased clockwise relative to FIG. 10 by a spring 410 or 411. The switching levers 412, 413 have respective bifurcated portions 416, 417 straddling and engaging respective projections 418, 419 of bridges 403 and 404. The feeler levers 408 and 409 with which the respective switching levers 412 and 413 are connected, are engageable with respective stepped selector cam discs 402 and 502 for plus-minus selection (FIGS. 10, 11).

A latch lever 420 (FIG. 10) controlled by a cam (not illustrated) of the machine drive shaft 121 (FIG. 2) releases the switching levers 412, 413 at the beginning of the machine run so that the springs 410, 411 can turn the levers 412, 413 clockwise about their respective pivot structures 406, 407. As a result, the bridge structure 404 gliding on the bearing member 401 and controlled by the feeler lever 409 is displaced to the left or right relative to FIG. 10 until the feeler lever 409 abuts against the contour of the plus-minus selector cam 402 (FIGS. 10, 11).

The bridge structures 403, 404 cooperate with a lateral dog pin 422 of a control shaft 421 or a control lever 423 of a cam follower (not shown) which is fastened to the control shaft 421 and is driven from a control cam 425.

The lever 399 (FIG. 10) riveted together with pin 397, is linked by constrained sliding engagement with an intermediate lever 429–430 rotatably mounted on a stationary bearing block 428. The intermediate lever 429–430 has a bifurcated portion straddling a pin of a bearing block 431 which is fastened on a square portion of control shaft 392 to transmit axial sliding motion thereto.

In the position shown in FIG. 10, the positive input gears 389 are in meshing engagement with the control segments 80. When the bridge structure 404, under control by lever 412 and selector disc 402, is shifted to the left, relative to FIG. 10, and thus positioned above the control lever 23, the subsequent movement of lever 23 rotates the bridge member 404 and the lever 399 in the clockwise direction, thus moving the double lever 429–430 counter-clockwise so that the control shaft is shifted to the right (FIG. 10) until the negative input gears 391 are opposite the control segments 80.

The above-described computer mechanism 388 corresponds to the one more fully illustrated and described in my Patent 3,066,861 (FIGS. 8 to 12) and in my copending application Serial No. 169,430, filed January 30, 1962 now abandoned (FIGS. 22 to 24).

The selector disc 402 (FIG. 11) is adjusted by means of a control segment 441 pivoted on a fixed pin 440 and angularly adjusted by the gear segment 251 (FIG. 8) of the differential mechanism 250 through a linking rod 442. The circular contour 445 of segment 441 is engaged by a roller 443 of a follower 444 pivoted at 447. The cam contour has a recess 446 which permits the follower 444 to be turned clockwise by a pull spring 449 acting upon the follower 444 through a linking rod 448. The linking rod 448 has a longitudinal slot 450 engaged by a pin 451 of an arm 453 firmly secured to a control shaft 452. A pull spring 454 is attached between the pin 451 and a pin 455 fixed to the linking rod 448. Rigidly secured to the control shaft 452 is the above-mentioned selector disc 402 whose cam contours 456 and 457 cooperate with feeler levers 409. The contour 456 causes selection of the positive counting gears 389, and contour 457 the selection of the negative counting gears 391 in the add-sub mechanism 388.

The control segment 441 is so designed that the negative transfer of the values taken from the selected setting of the magnets 96A/2, 96B/2 and 96C/1 can be entered into the negative counting gears 391 of the add-sub mechanism 388 only if the differential mechanism 250 of the mode-of-operation control key bank is in the position 7 (FIG. 8). The selector disc 402 is then rotated to such an extent that the contour 457 is opposite the feeler lever 409 so that the lever 409 shifts the add-sub mechanism 388 to the right, relative to FIG. 10. In all other positions, the selector discs 402 and the add-sub mechanism 388 occupy the position shown in FIG. 10 in which the positive counting gears 389 are opposite the control segments 80.

The performance of the device for computing discount amounts and the processing of these amounts in the machine is as follows.

The transactions exemplified by the sales check 131 shown in FIG. 5 require posting a number of discount items into the machine, drawing the sum of these items, computing the amount of discount and deducting it from the sum determined.

It is assumed in this particular example that all of the posted items are subject to discount. Accordingly, these items are entered in the above-described manner through the control segments 80 into the positive counting gears 389 of the add-sub mechanism 388, whereafter, by actuation of the control key 9, the sub-total in the amount of $40.90 is drawn from the positive side of the add-sub mechanism 388.

While this takes place, the magnets 96A/2, 96B/2 and 96C/1 are set to the value thus determined. In contrast to the example first described, where the final sum was drawn from the adding mechanism 120, only the sub-total is taken from the positive counting gears 391 in the present example. The position 8 of the control segment 344 (FIG. 9) does not have a recess active in this position, so that the uninterrupted cam contour 459 can cooperate with the feeler pin 349. At the end of this machine run, the gear segment 251 of the differential mechanism 250 displaces the control segment 441 (FIG. 11) angularly so that the roller 443 can drop into the recess 446. This places the selector disc 402 to the negative feeler position in which, during the following machine run, the feeler member 409 will engage the contour 457 and thereby places the negative counting gears 391 opposite the control segments 80.

Subsequent to the subtotalizing machine run, a further machine run is automatically released as described in the first example. During a further machine run, the now-deflected pawls 93 of the respective magnets 96A/2, 96B/2 and 96C/1 are being scanned, and the determined amount of discount, namely $1.22 is now transferred to the negative counting gears 391 of the same add-sub mechanism 388. When this machine run terminates, the differential mechanism 250 turns the control segment 441 (FIG. 11) to the position 11 (FIG. 7) in which the contour 445 is opposite the roller 443. Hence the selector disc 402 is effective during the following grand-totalizing machine run to draw the sum of $39.68 from the positive counting gears 389 of the add-sub mechanism 388, for indication and printing of this ultimate total.

If, in analogy to the example first described, the transaction comprises items subject to discount as well as items on which no discount is due, the discount items may also be entered into the special adding mechanism 120 as described in the foregoing, and subsequently the computing operations can be performed in the manner described above.

A device described in the foregoing for the computation of amounts involving a tax or discount will now be described with reference to a further example relating to a cash register additionally equipped with a device for computing the change due to a customer who tendered an amount higher than the sales total. The sales check 132, shown in FIG. 6, exemplifies a transaction of this kind.

According to FIG. 6 a sequence of taxable and non-taxable sales items has been entered into the machine, the sum of $40.90 of the taxable items has been drawn, the tax amount of $1.22 has been determined from this sum, the sub-total of $88.54 of all sales items plus the amount of tax has been drawn, the tendered amount of $100.00 has been entered, and the change in the amount of $11.46 has been determined.

The device for controlling and performing these registering and computing operations is designed as follows.

In contrast to the embodiments so far described, the control key bank 5 according to FIG. 1 is provided, beside the latchable key 10 for controlling grand-totalizing machine runs, with a control key 8 (FIG. 12, also shown by broken lines in FIG. 5) which serves to release the partially automatic machine runs for determining the amount of tax as well as those for entering the amount tendered and determining the amount of change. The control key 8 (FIG. 12), which likewise cooperates with the blocking assembly 240 in the same manner as described above with reference to the control key 9, controls by means of its cross pin 460 a zero pawl slider 462 with an extension 461, and also a control slider 463. Both sliders are normally held in the illustrated starting positions by respective springs (not illustrated). The shank 464 of control key 8 coacts with an abutment 465 of the differential mechanism slider 466 which is connected by a pin 467 with a linking rod 469 fastened to the feeler lever 468 of the differential mechanism 470. The zero pawl 471 has a pin 472 cooperating with the extension 461 of the zero pawl slider 462. The upper left end of the control slider 463, relative to FIG. 11, carries a pin 473 engaged by a control pin 474. The control pin 474 is fastened on the above-described control bridge 30 (FIG. 2) which is turned counter-clockwise when one of the amount keys 7 is being actuated, so that then the control pin 474 displaces the control slider 463 along guide pins 475 and 476 a given distance to the left, relative to FIG. 12.

A vertical slot 477 and a downwardly inclined sloping edge 478 are machined into the control slider 463 (FIG. 13). Located beside the control key 8 is a blind key 480 whose cross pin 481 passes through a cam slot 482 of control slider 463. As long as none of keys 7 is depressed, the pin 460 of control key 8 can pass into the slot 477. However, when any one of keys 7 is depressed, a corresponding key slider 26, acting by way of the control bridge 30, displaces the control slider 463 to some extent so that, when thereafter the control key 8 is being depressed, its cross pin 460 does not enter into the slot 477 but will act upon a slope 478 and thereby displaces the control cam 463 to the left, relative to FIG. 12 or FIG. 13, until the blind key 480 has reached its lowest position in cam slot 482. In this position, the blind key 480 can cooperate with the above-mentioned abutment 465 of the differential mechanism slider 466.

The control slider 463 carries a dog pin 483 (FIG. 13) engaging a slot in an arm 484 of a bell crank lever 485 whose other arm 486 is linked by a rod 487 to a lever 489 pivoted on a stationary pin 488 to act upon a link 490. A longitudinal slot 491 of link 490 is engaged by a pin of a control lever 493. A pull spring 495, fastened between pin 492 of lever 493 and a pin 494 of link 490, provides engaging force between link 490 and lever 493. The control lever 493 is fastened on a control shaft 496 and engaged by one end of a pull spring 497 whose other end is stationarily attached to hold the control lever 493 against a fixed stop pin 498. Another pin 499 fastened on the control lever 493 engages a longitudinal slot of a lever 501. A pull spring 503 has its upper end fastened to lever 501 to provide for engaging force between lever 501 and control lever 493.

The selector disc 502 (FIG. 13) is similar to the selector disc 402 (FIG. 10) described with reference to the preceding embodiment, and possesses a cam contour having a raised portion 504 and a lower portion 505 for cooperation with a feeler lever 408. That is, the contour portions 504 and 505 have respectively different distances from the cam control shaft 496.

The adjustment of the selector disc 502 can be effected by means of the link 490 controllable by the control slider 463, or it can be effected with the aid of the lever 501. The lever 501 (FIGS. 13, 12) is linked by a pin 506 to one arm 507 of a three-armed lever 508 rotatable on a stationary pin 509. The lever 508 is adjusted by a control disc 511 in the highest negative decimal position of the grand-total computer mechanism 510 (FIGS. 2, 10). The circular contour 512 of the 511 has a recess 513 and cooperates with a feeler pin 514 of a lever 516 which is rotatable about a stationary pivot pin 515 and has a nose 517 in coactive relation to a dog pin 518 of lever 508. Lever 508 is connected by a linking rod 519 with a control member 520 pivoted on a pin 521 and having a hook-shaped portion 522 engageable with a stop shoulder 523 of the differential mechanism slider 466.

The differential mechanism 470 (FIG. 12) has a gear segment (not illustrated) in driving connection with a control disc 525 (FIGS. 12, 14) rotatable on a shaft 524. The control disc 525 has respective contours 526, 527 and 528 for releasing respectively different, automatic machine runs. These circular contours are interrupted by essentially rectangular recesses 529, whose bottom contours 530 and 531 are closer to the shaft 524. The control disc 525 cooperates with a feeler pin 533 of a feeler lever 534 which is connected by a linking rod 535 with the blocking assembly 240 (FIGS. 12, 14). The feeler lever 534 carries an entrainer 536. A rod 537 linked to the entrainer 536 acts upon a zero pawl 471. The design and function of the linking rod 537 correspond to the rod 262 in the preceding embodiment described with reference to FIG. 8. The feeler lever 534 is fastened on the shaft 261 (FIGS. 12, 14, 8) and is in driving connection with the above-described control cams 68, 69 (FIG. 2) through a lever 268 and a link 271.

A control cam 540 (FIG. 15) is journalled on the shaft 524 and is fastened by screw to the control disc 525. The cam 540 has a circular contour 541 and a cam recess 542 for cooperation with a roller 543 of a follower 544 biased toward the contour by a pull spring 545. The follower 544 is connected by a curved rod 546 with a bell-crank lever 547 which has a stop arm for coaction with a stop shoulder 549 of the differential mechanism slider 466.

In contrast to the control segment 344 shown in FIG. 9, the control segment 550 which serves for selecting the mode of machine operation (FIG. 16) is so designed that it possesses, aside from the contours 551, 552 for controlling adding machine runs, two contours 553 and 554 for controlling grand-totalizing machine runs, as well as a contour 555 for controlling subtotalizing machine runs. The other components of the automatic mode-of-operation control means shown in FIG. 9 are retained without change.

The grand-total computer shown simplified in FIG. 10 at 510 corresponds to a known design (for example Patent 3,066,861). It is displaceable on a control shaft 560 and also possesses positive counting or input gears 561 and negative input gears 562. The device for displacing the totalizer is designed in substantially the same manner as the one described above for the add-sub computer mechanism 388. As shown in FIG. 10, the bearing block 395 accommodates a sleeve 396 whose rear end is riveted together with a switch lever 398 and whose forward end, facing the observer, carries a bearing number 400 for a bridge member 403.

The bearing block 395 further accommodates a sleeve 406 which is firmly connected with the above-mentioned feeler member 408 (FIG. 13) and which carries on its forward end a switch lever 413 biased by a pull spring 411. The switch lever 413 has a fork recess 417 located above an extension 419 of the bridge member 403 and engages the extension 419 when the feeler lever 408 cooperates with the selector disc 502. The adjustment of the switch lever 413 and the bridge member 403 takes place in the manner described above with reference to the switch member 412 and the bearing member 404. A control lever 398 fastened to the sleeve 396 acts upon a bearing block 427 fastened on the control shaft 560. In the position shown in FIG. 10, the feeler lever 408 rests upon the positive contour 504 of the selector disc 502 (FIG. 13) so that the positive input gears 561 of the grand-total computer 510 are in meshing engagement with the respective control segment 79, and the negative gears 562 are disengaged therefrom.

The performance of the device last described will be explained with reference to the example of transactions exhibited by the imprints on the sales check 132 shown in FIG. 6.

As in the examples previously described, the taxable and non-taxable transaction items are posted into the machine. The taxable items are entered into the adding mechanism 120, and all of the items are entered into the positive input gears 561 of the grand-total computer 510. Thereafter the control key 8 is actuated. As a result, the total of the taxable items in the amount of $40.90 is drawn and simultaneously the magnets 96A/2, 96B/2 and 96C/1 are energized in the manner already described. Another machine run is automatically released. During this run, the magnets 96A/2, 96B/2 and 96C/1 are scanned, and the tax amount of $1.22 is transferred into the positive counting gears 561 of the totalizing computer 510. This machine run is automatically followed by another machine run for determining the subtotal in the amount of $88.54 of all entered items plus the computed tax amount of $1.22.

When these operations are completed, the attendant cashier posts the tendered amount of $100.00 into the keyboard and, by actuating the same control key 8, releases the change computing operation in the manner known (for example from Patent 3,066,861).

As the amount keys 7 are actuated during posting of the tendered amount, the corresponding key bank sliders 26 (FIG. 2), acting through the control bridge 40, displace the control slider 463 (FIGS. 12, 13) until its sloping edge 478 lies beneath the key pin 460. When the cashier then actuates the control key 8 for releasing the change-computing machine run, the control slider 463 is shifted further to the left, relative to FIGS. 12 or 13, so that the blind key 480 is now in active position and the selector disc 502 has its negative contour 505 located beneath the feeler lever 408. When now the differential mechanism 470 commences running, the appertaining slider 466 is arrested at its stop 465 by the blind key 480, and the contour 551 of the control segment 550 (FIG. 16) of the mode control device shown in FIG. 9 now cooperates with the pin 349 of feeler lever 350 which adjusts the machine for the mode "addition."

Simultaneously the grand-total computer 510 (FIGS. 2, 10) controlled by the selector disc 502, is shifted to the right relative to FIG. 10. In the second half of the machine run, the tendered amount of $100.00 is entered into the negative counting gears 562, this amount having been scanned from the keys 7 by means of the differential mechanism 40 during the first half of the same machine run.

When the first sales item in the amount of $25.36 (FIG. 6) is entered into the positive counting gears 561 of the computer 510, the control disc 511 driven by the negative counting gear 562 of the highest decimal position, is rotated counterclockwise relative to FIG. 12, with pin 514 entering into the recess 513 and turning the switch lever 516 clockwise about pin 515. The member 520 is thus caused to swing its abutment 524 away from the path of the extension 523 on the differential-mechanism slider 466, and the lever 501 (FIG. 13) performs an idle stroke because the selector disc 502 is already in the positive selector position and the positive counting gears 561 of computer 510 are opposite the control segments 79.

However, when the tendered amount is entered in the negative sense, the selector disc 502 is placed to the negative position under control by key 7 and the control key 8. During the machine run, the totalizing computer 510 is shifted to the right until the negative counting gears 562 are opposite the control segments 79 and, after being shifted into meshing engagement with the control segments, will receive the tendered amount of $100.00. During this performance, the control disc 511 turns clockwise (FIG. 12), and the recess 513 rotates the control lever 516 counterclockwise so that the abutment 522 enters into the path of the differential-mechanism slider 466. During this operation, the lever 501 holds the selector disc 502 in the already adjusted, negative position in which the contour 505 will cooperate with the feeler lever 408 after the control slider 463 resumes its starting position upon termination of this machine run.

During entering of the tendered amount, the contour 528 (FIG. 14) of control disc 525 coacts with the feeler lever 534 and automatically releases the subsequent machine run for determining the amount of change, the release being effected with the aid of the blocking assembly 240. During the latter machine run, the differential mechanism slider 466 abuts against the stop 522, the control segment 550 (FIG. 16) has its contour 553 placed in engagement with the feeler pin 349 (FIG. 9) for controlling a grand-totalizing machine run, and the feeler lever 534 (FIG. 14) enters into engaging relation to the contour 530 of the control disc 525. The amount of change computed as $11.46 is taken from the negative counting gears 562 of the grand-total computer 510. As this is taking place, the positive and negative gears 561 and 562 of computer 510 return to their starting positions, the determined amount is imprinted upon the sales check 132 (FIG. 6), and exhibited in indicator 15, before the machine operations are stopped.

By varying the control effected by the selector disc 502, items subject to discount and items not subject to discount may also be processed in the same manner in conjunction with the change computing device last described.

It is further readily possible to also take into account any requirements involving differently taxable individual or multiple items to be processed in the machine. For example, tax or discount rates of 2%, 3%, 4% or other rates, may be processed. For this purpose corresponding selector keys 570, 571, 572 (FIG. 17) are to be provided. Preferably, they are distinctively marked, for example by different colors. Accordingly, the selector switches 53 shown in FIGS. 2 and 7 are to enlarge. They may be designed as double or multiple selector switches 575 (FIG. 18) of which the sectors 576 are to be interwired with the magnets 96 according to FIG. 7, and the sectors 577 or 578 are wired for the respective rate factors 2% and 4% in accordance with similar circuit connections. A selector switch 580 corresponding to the selector switch 53G (FIG. 7) of the operation control key bank, is provided with one or more connecting leads 581 . . . in properly coordinated positions aside from the manifold lead 142; and the leads 581 . . . are to be connected with the corresponding slide contacts 582 . . . . Furthermore, the control cam 583 (FIG. 19) corresponding to control cam 540 shown in FIG. 15, is provided with stepwise arranged stops 584, 585, 586 in respective positions 9, 10 and 11 (FIG. 7); and the bell crank lever corresponding to the lever 547 shown in FIG. 12 is provided, according to FIG. 20, with stepped abutments 588, 589, 590 which cooperate with the shoulder 549 of the differential mechanism slider 466. The design of the required control disc 591, corresponding to the disc 525 (FIGS. 12, 14), is apparent from FIG. 21. The contour 592 of control disc 591 releases respective automatic machine runs when in positions 8 to 11 (FIG. 7).

When differently taxable items are entered in such a modified machine under control by the selector keys 570 or 571 (FIG. 17), and when thereafter the control key 8 is actuated, the adding mechanism coordinated to the selector key 570 is first scanned out, the amount of tax is computed in the above-described manner and entered into the totalizing computer 510. Subsequently, two further machine runs are released automatically with the result that the adding mechanism coordinated to the selector key 571 is likewise read out, and the subsequently computed amount of tax is likewise entered into the totalizing computer 510. The operations for computing an amount of change then follow in the above-described manner.

To those skilled in the art, it will be obvious upon a study of this disclosure, that my invention permits of a great variety of modification with respect to mechanical and electrical components and their arrangement, and consequently can be given embodiments other than those particularly illustrated and described herein, without departing from the essential features of my invention and within the scope of the claims annexed hereto.

I claim:

1. A registering business machine, comprising amount key banks, operation control keys, a selector key, a selective operable adding mechanism, a totalizer and respective differential mechanism connecting said key banks to said totalizer and to said adding mechanisms when selected by said selector key for entering into said totalizer and mechanism the amounts posted into said amount key banks, in combination with apparatus for computing and indicating tax and discount amounts corresponding to a given rate, said apparatus comprising electric selector switches connected to respective ones of said differential mechanisms to be selectively set thereby, said switches having respective groups of fixed contacts; displaceable follower members connected to respective ones of said differential mechanism to move in accordance with the mechanism displacement, each of said follower members having a given path of displacement and having stop means at which said follower member is arrestable for stopping the differential mechanism; a group of electromagnets having respective magnetically actuable detent members sequentially arranged along said displacement paths, each detent member being magnetically controllable to move to an active position in which said detent member is engageable with said stop means to arrest one of said respective follower members in a selected position of said path; electric circuit means interconnecting said groups of switch contacts and said magnets and forming together therewith a multiplying assembly for multiplying the sum from said adding mechanism by said rate under control by said control keys to selectively energize said magnets for placing the respective detent members to active positions jointly indicative of the multiplication result; means for displacing said differential mechanisms independently of said operation control keys to the respective stop positions determined by said detent active positions respectively for transferring into said totalizer the amount corresponding to said rate.

2. In a registering business machine according to claim 1, said electric circuit means connecting said electromagnets to said switch contacts in accordance with the numerator of said given rate and with a shift in decimal position corresponding to the denominator of said rate.

3. A business machine according to claim 1, comprising a bank of said operation control keys, a selective operation control switch (53G) connected with said control key bank to be selectively set thereby, said operation control switch being electrically connected with said circuit means, and the operation of said multiplication-effecting circuit means being dependent upon at least one given setting of said control switch.

4. In a business machine according to claim 2, said electric circuit means having selectively activatable circuit leads (141 to 169) connected to said magnets for selectively energizing said magnets, said leads being connected to said fixed contact groups of said selector switches (53) to be activated in dependence upon the settings of said respective selector switches, and said control keys comprising at least one control key (8, 9) for releasing a summing operation, whereby the selected ones of said leads are activated under control by said operation control switch upon release of a summing operation by said one control key.

5. A business machine according to claim 4 characterized in that the sum of tax or discount items drawn from the computing mechanisms (110, 120, 388, 510) during a summing machine run is transferred to the indicator means; and the magnets (96) are adjusted to the computed tax or discount amount under control by the control key (8, 9), the differential mechanism (40, 250, 470), the selector switches (53), the circuit leads (141 to 169), a switch (170) controlled by the machine main shaft (121), as well as by the operation-control and adding-mechanism selector means (344, 402, 502, 550).

6. A business machine according to claim 1, comprising automatic means for selection of machine operation and for adding-mechanism selection (344, 402, 502, 550), and automatic control means (254, 280) for selectively controlling the machine runs to additively and subtractively transfer into the totalizing mechanisms (118, 388, 510) the amounts represented by the setting of the energized magnets (96).

7. A business machine according to claim 6 characterized in that, after completion of the adding machine run for entering the computed amount in accordance with said rate, the automatic control means (254, 280), in conjunction with the operation-control and adding-mechanism selector means (344, 402, 502, 550) are operative to effect a machine run for determining the grand total from the totalized amount of the items contained in the totalizer (110, 120, 388, 510) plus or minus the amount according to said rate.

8. A business machine according to claim 7, characterized in that, during the sum drawing operation initiated by the control key (8, 9), the automatic control means (254, 280) control the operation-control and adding-mechanism selector means (344, 402, 502, 550) and the machine-run releasing blocking assembly (240) by means of the coordinated differential mechanism (250), to prepare the transfer of the amount corresponding to said rate.

9. In a business machine according to claim 8, said automatic control means (254) having a feeler member (260) and a blocking lever (262) cooperating with said blocking assembly (240) and with the zero pawl (224), said feeler member (260) acting upon said blocking lever (262).

10. A business machine according to claim 8, characterized in that the automatic control means (254) is connected through a feeler lever (283) with an arresting member (291) for adjusting the differential mechanism (250).

11. A business machine according to claim 6, characterized in that the differential mechanism (250) has a slider (231) whose adjustment is controlled selectively by the control key (8, 9) when determining the sum of items subject to said rate, by a stop coordinated to the final position of the control key bank (position 11) when the computed amount according to said rate is additively or subtractively transferred, and by the automatic control means (280) when performing the subsequent grand-totalizing operation.

12. A business machine according to claim 6, characterized in that the differential mechanism (250) of the operation control key bank (5) adjusts the operation-control and adding-mechanism selector means (344, 402, 502, 550).

13. A business machine according to claim 1, characterized in that, for computing amounts of tax or discount in accordance with respectively different rates, there are provided respectively different computing mechanisms selectable by means of respectively different adding-mechanism selector keys (570, 571, 572); the respective sum totals for the different rates being sequentially drawn under control by a single operation control key (8, 9) whereafter respectively different amounts according to said rates are determined and the magnets (96) are set by means of circuit leads (142 etc., 581 etc.) for the subsequent transfer operation.

14. A business machine according to claim 8, comprising automatic control means (583, 591) which, upon initiation of machine runs for determining amounts in accordance with respectively different rates of tax or discount initiated by the control key (8, 9), release these machine runs in such a manner that sequentially the sum is drawn from the adding mechanism correlated to the adding-mechanism selector key (570) and then the amount determined therefrom in accordance with the applicable rate is automatically entered into the totalizing computer (110, 120, 388, 510), the sum is automatically drawn from the adding mechanism correlated to the adding-mechanism selector key (571) and the amount thus determined is likewise entered into said totalizing computer, and thereafter the grand total is drawn from the totalizing computer.

15. A business machine according to claim 1, comprising a control device (441, 463, 511, 520) for computing amounts of change, said control device being engageable with said totalizer means to be controlled thereby.

16. A business machine according to claim 5, comprising control devices (8, 417, 502, 525, 540; 541, 463, 511, 520) having a common control member (525) which supervises the performance of manually releasable respective subsequent machine runs for determining the grand total modified by the sum of the items subject to said rate and for determining the amount of change.

17. In a business machine according to claim 6, said control member (525) having cam contours (526, 527, 528) for automatically releasing the respectively different machine runs for determining subtotals, grand totals and amount of change, and having further cam contours (530, 531) which stop the machine upon determining the subtotal of all entered transaction items plus or minus the computed amounts subject to the rate of tax or discount and after completion of a grand-totalizing machine run for determining the amount of change.

18. A business machine according to claim 1, characterized in that the computing operations released by the subsequent machine runs for determining the amounts of tax and discount as well as of the amount of change, are marked differently on the records produced by the machine (130 to 132).

19. A business machine according to claim 16, characterized in that one and the same control key (8) is provided to manually release the subsequent machine runs for determining the subtotals inclusive of the positive and negative amounts corresponding to said rate and to determine the amount of change.

20. A business machine according to claim 16, characterized in that the setting of the differential mechanism (217) for the operation-control key (8), which mechanism adjusts the operation-control and computing-mechanism selector means (502, 550), is controlled selectively independence upon a stop in the highest decimal position (11) of the operation-control key bank, by the blocking member (547), by a blind key (480) adjustable by means of the amount posting means (7) and the control key (8), as well as by the blocking member (520) adjustable by the grand totalizing computer (510).

21. In a business machine according to claim 16, characterized in that the means (502) for selecting the positive or negative side of the grand-total computer mechanism (510) are controlled by a key slider (463) preadjustable by the amount keys (7) and also by a control member (511) adjustable from the highest negative decimal position of the grand-total computing mechanism (510).

22. A business machine according to claim 21, characterized in that the control member (511), which adjusts the computing mechanisms selector means (502) and the operation control means (550), swings the blocking member (520) out of the path of the slider (466) of the differential mechanism (470) for the control key bank (5), when a positive transaction item is being entered.

23. In a business machine according to claim 1 characterized in that segments (41) comprised by the differential mechanisms (40) which are arrested up to a subsequent machine run, maintain the adjusted positions of the selector switches (53) conductively connected with the magnets (96); and the follower members (39) for scanning the detents (93) adjusted by the magnets (96), cooperate with a feeler lever (38) which during each machine run is returnable to the starting position in the differential mechanism (40).

24. A business machine according to claim 23, characterized in that the detents (93) are adjusted by the magnets (96) during the sum drawing machine run for determining the sum subject to said rate of tax and discount, and the detents are scanned at the beginning of the next following machine run and subsequently are reset to the inactive position.

25. A business machine according to claim 24, characterized in that the resetting of the detents (93) is effected by means of a clearing lever (98) controlled from the control shaft (109, 393, 560) of the computing mechanism (110, 388, 510) which receives the totalized amount inclusive of the computed amount of tax or discount.

26. In a business machine according to claim 1, individual ones of said fixed contacts (54) of a selector switch (53) appertaining to a lower decimal position being grouped together and electrically connected with a contact group (54) of a selector switch (53) appertaining to a higher decimal position.

27. In a business machine according to claim 1, some of said magnets (96) being directly controlled by a contact group of one of said selector switches (53), and other magnets (96) being controlled by series-connected contact groups of respective other selector switches (53) correlated to a plurality of decimal positions.

28. A business machine according to claim 1, comprising a clearing lever, said detents (93) controlled by said respective magnets (96) being resettable by said clearing lever, said clearing lever being controlled by one of the computing mechanism (110, 388, 510).

29. A business machine according to claim 28, characterized in that the clearing of said detents takes place when the computing mechanisms (110, 388, 510) are moved into engagement with the corresponding control segments (79, 80) under control by control shafts (109, 392, 160).

30. In a business machine according to claim 1, each of said selector switches (53) for respective different decimal positions comprising several parallel-arranged contact rows (54a, to 54m) having respectively different circuit connections, fixed collector contacts (56a to 56m, n) coacting with said respective rows, being connected with a switch contact 54G/8) correlated to the operation control key bank (5), said switch contact being connected to said collector contacts, the connection between the connecting contacts and the switch contact being either direct (leads 142 to 144) or in series with contact groups (54a, 54c, 54e, 54g) appertaining to the next lower digit position.

31. In a business machine according to claim 30, said contact rows (54a, 54c, 54i) appertaining to said selector switches (53) of the individual decimal positions being groupwise interwired (0 to 3; 4 to 6; 7 to 9) in accordance with the value (0–1–2) of the tens-transfer to the next higher decimal position required by the multiplication to be performed; said contact rows being conductively connected with respective collector contacts (56b, 56d, e, 56f, g) of the selector switch (53) for the next higher decimal position.

32. A business machine according to claim 30, characterized in that the contact row (54f) which cooperates with the collector contact (56f, g) in the selector switch 53 for the one-dollar key bank controls the magnets (96A) of the penny row, the contact row (54h) cooperating with the collector contact (56h) in the selector switch (53) for the ten-dollar row controls the magnets (96B) of the dime row, and the contact rows (54h, 54i, 54l, 54m) cooperating with the collector contacts (56h, 56i, 56k, l and 56m, n) in the selector switch (53) for the ten-dollar row control the magnets (96c) of the one-dollar row.

References Cited by the Examiner

UNITED STATES PATENTS

| 3,156,412 | 11/1964 | Julius et al. | 235—146 |
| 3,181,784 | 5/1965 | Becker | 235—2 |

FOREIGN PATENTS

| 224,365 | 11/1962 | Austria. |
| 1,128,196 | 4/1962 | Germany. |

RICHARD B. WILKINSON, *Primary Examiner.*

STEPHEN J. TOMSKY, *Examiner.*